April 10, 1956  A. A. MUEHLING  2,741,070
SWING GRINDER
Filed March 30, 1953  16 Sheets-Sheet 1
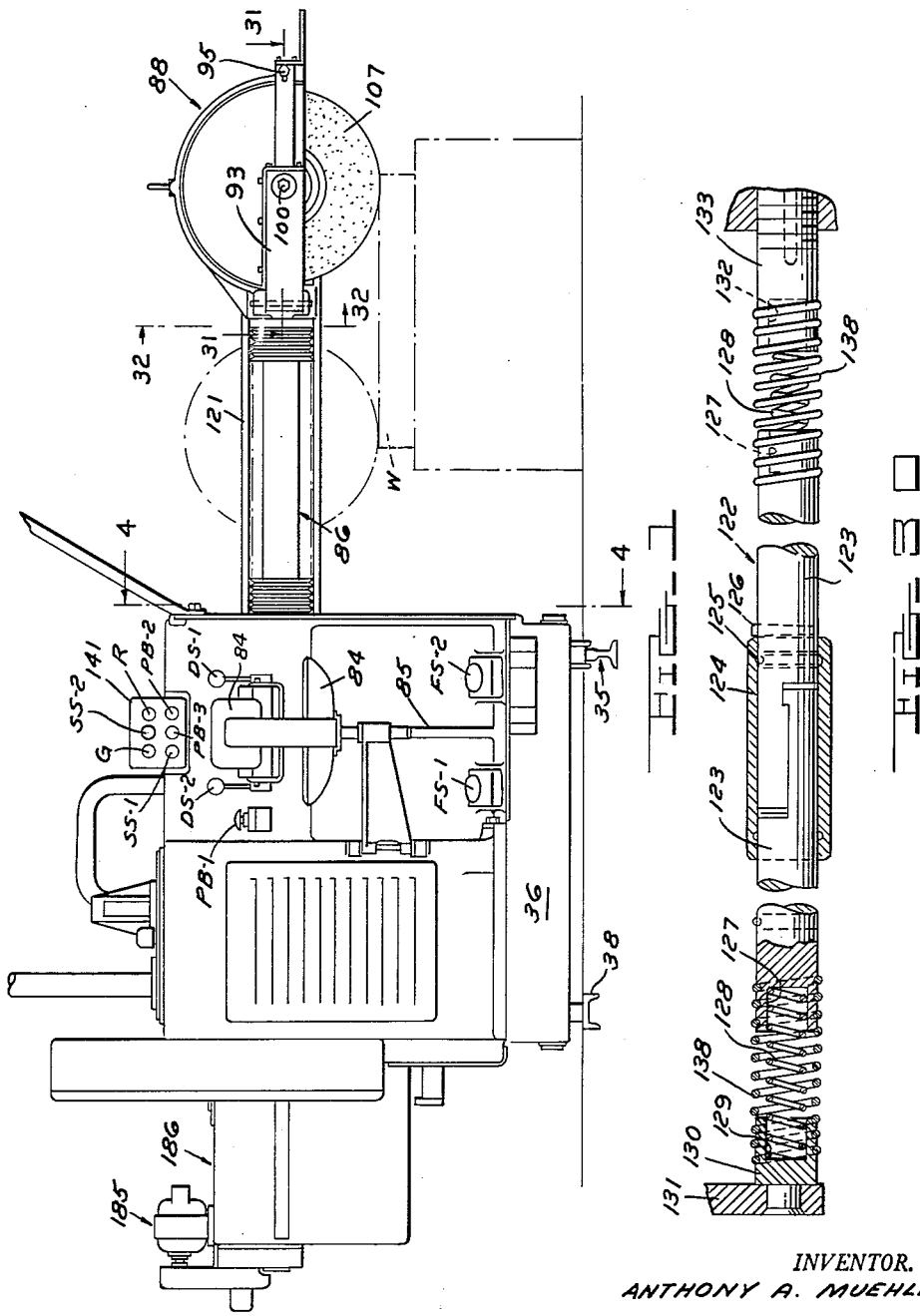
INVENTOR.
ANTHONY A. MUEHLING
BY
Whittemore, Hulbert & Belknap
ATTORNEYS April 10, 1956  A. A. MUEHLING  2,741,070
SWING GRINDER
Filed March 30, 1953  16 Sheets-Sheet 2
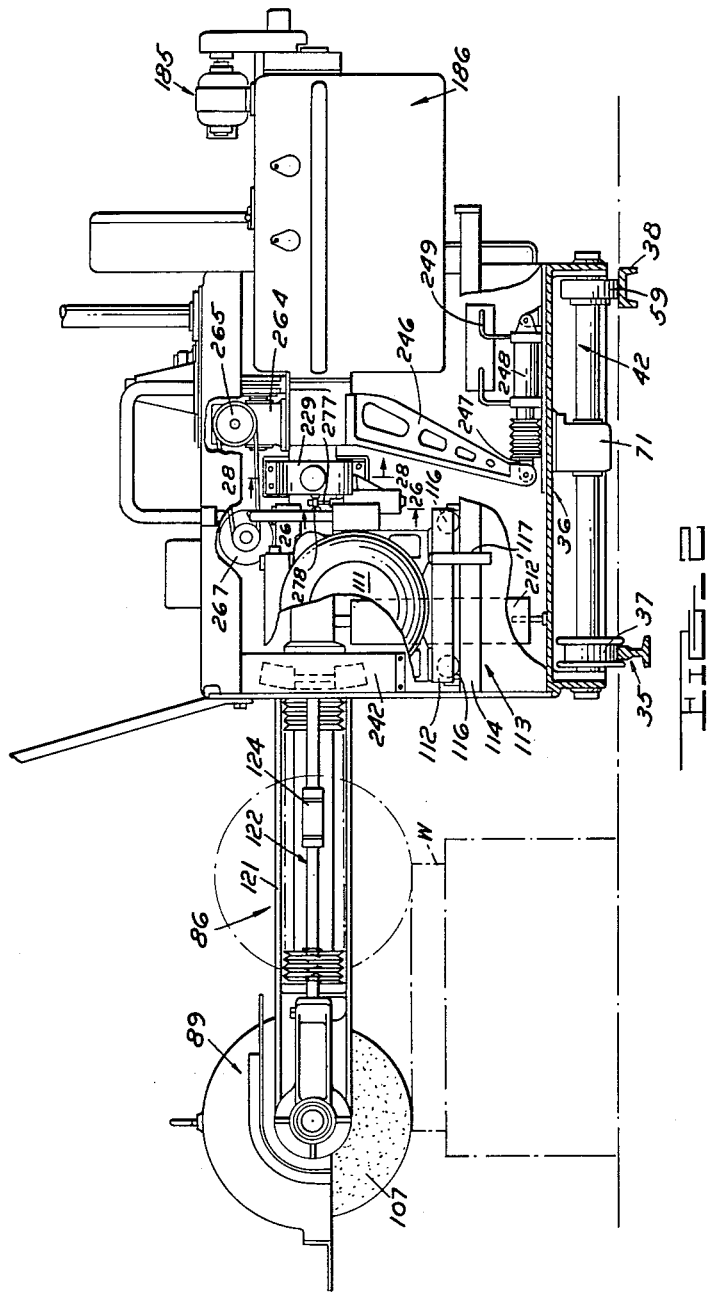
INVENTOR.
ANTHONY A. MUEHLING
BY
Whittemore, Hulbert & Belknap
ATTORNEYS

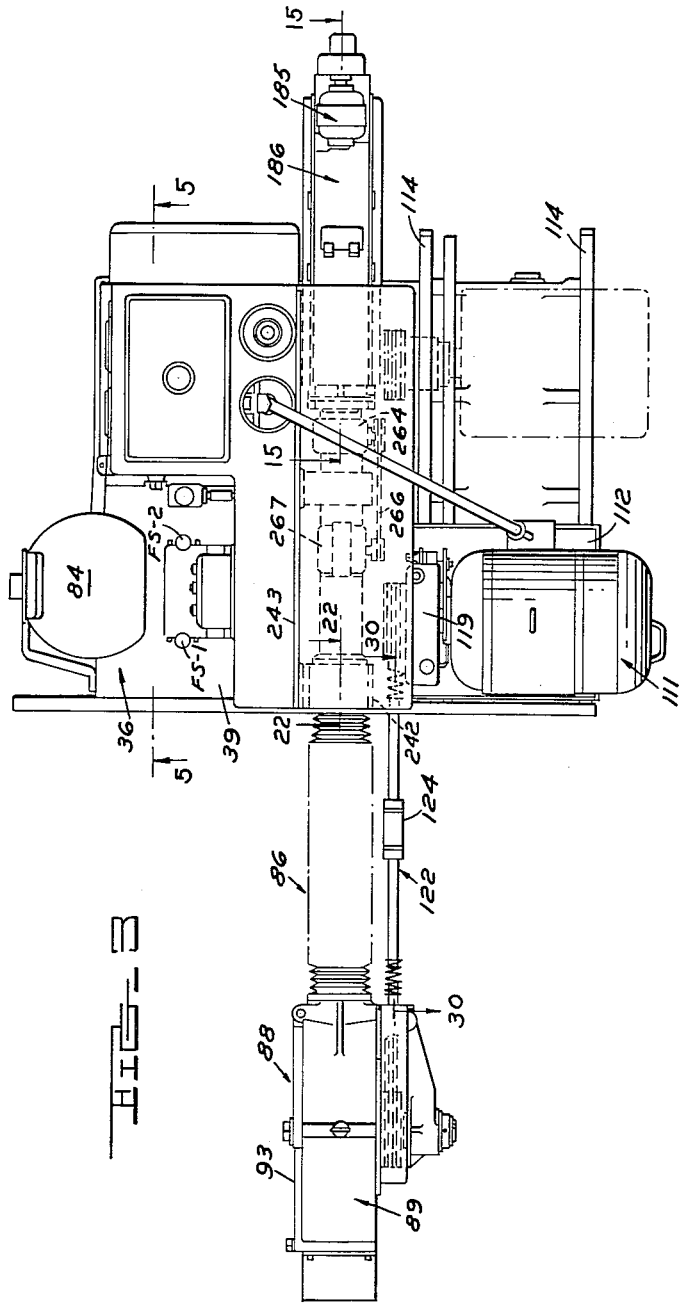

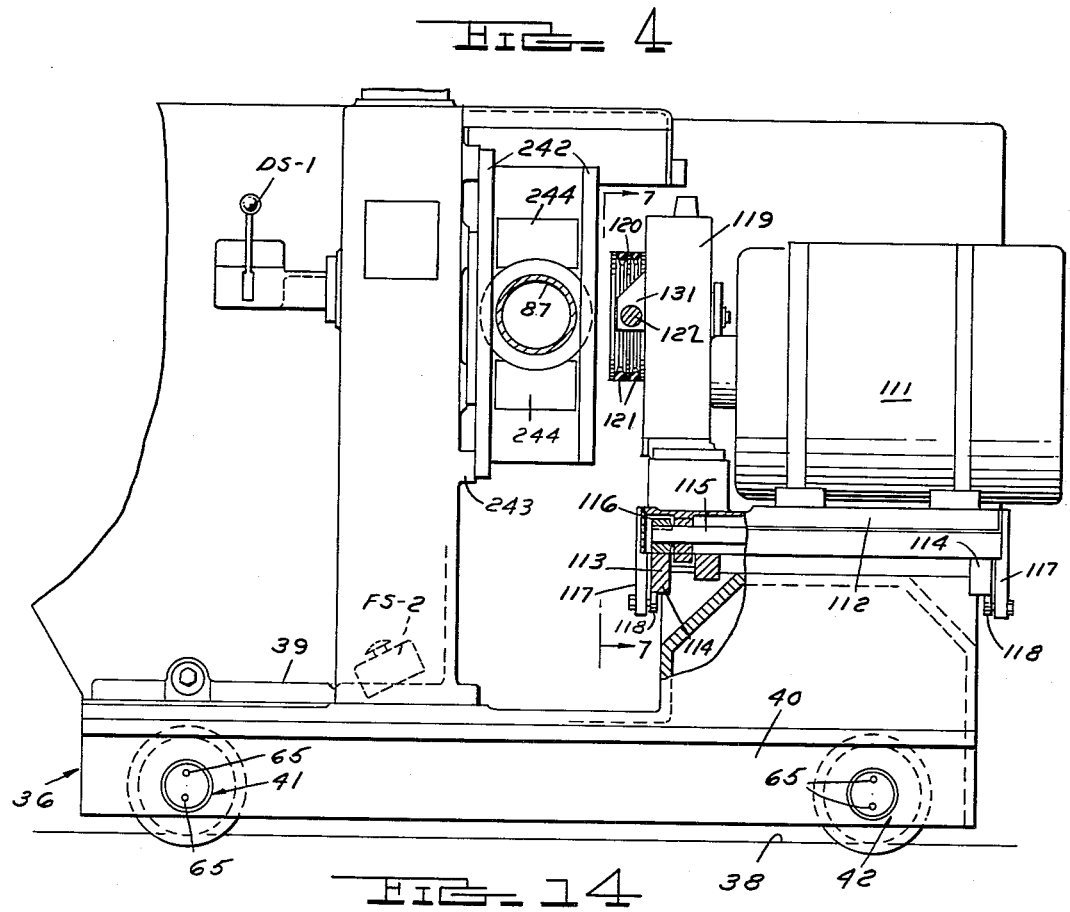
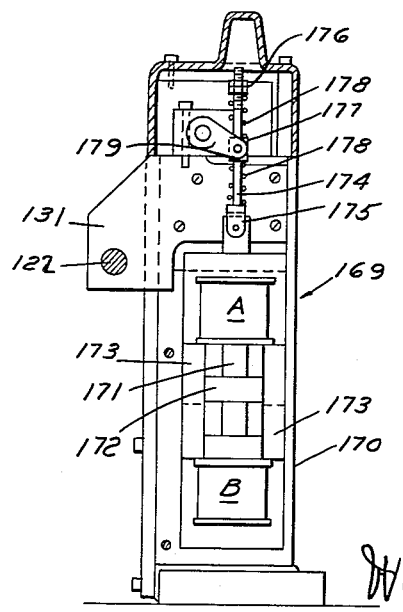

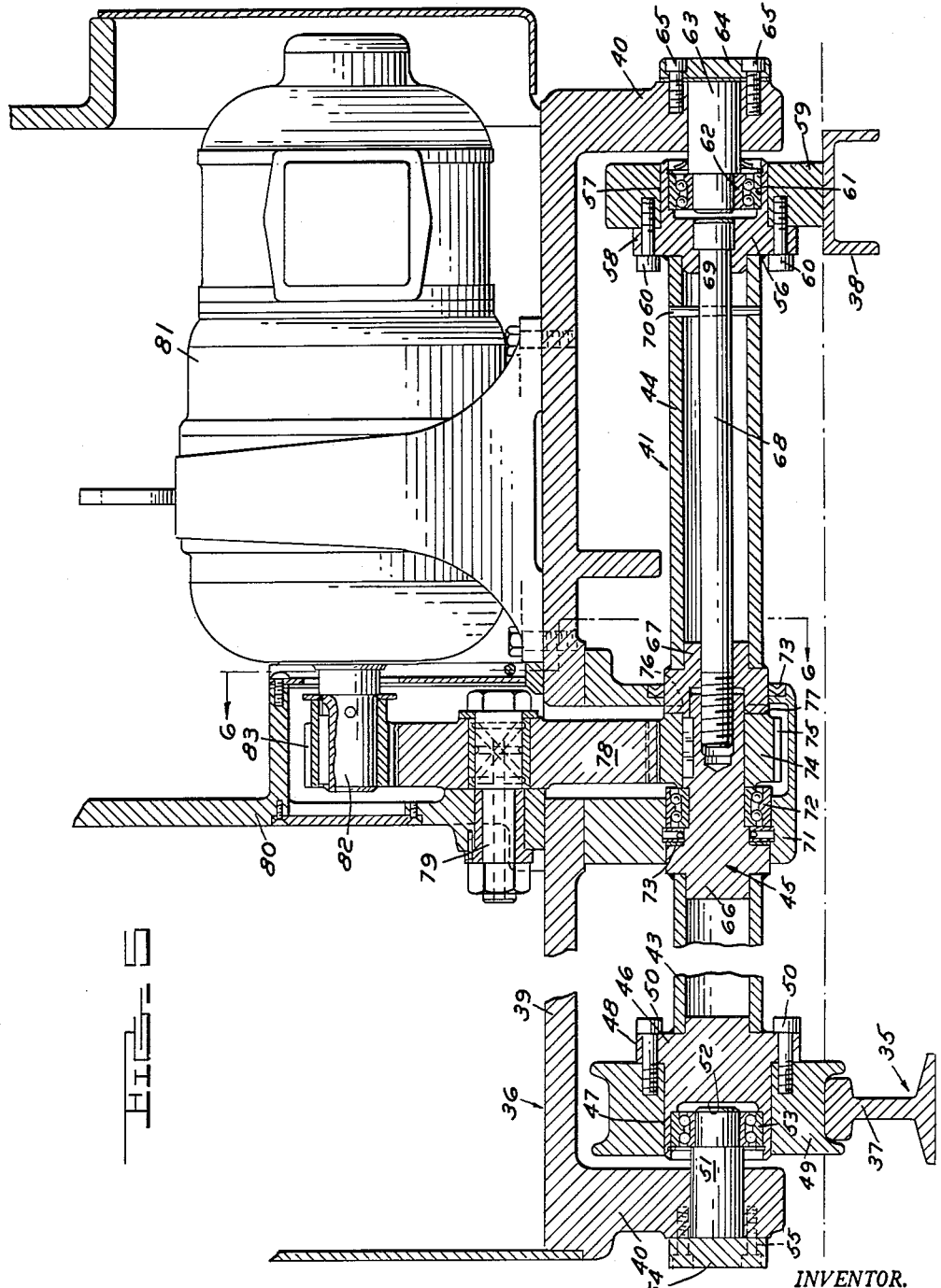

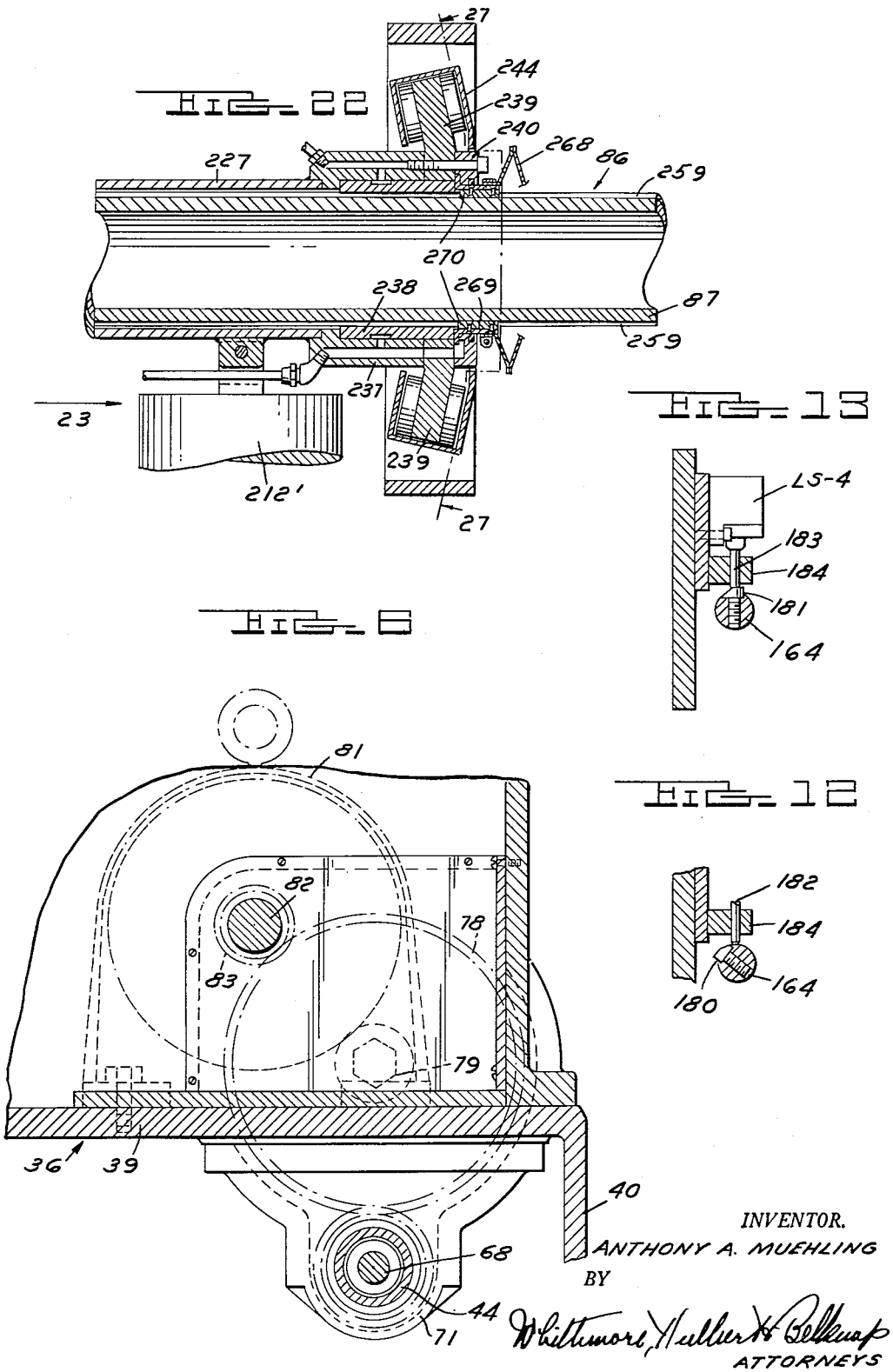

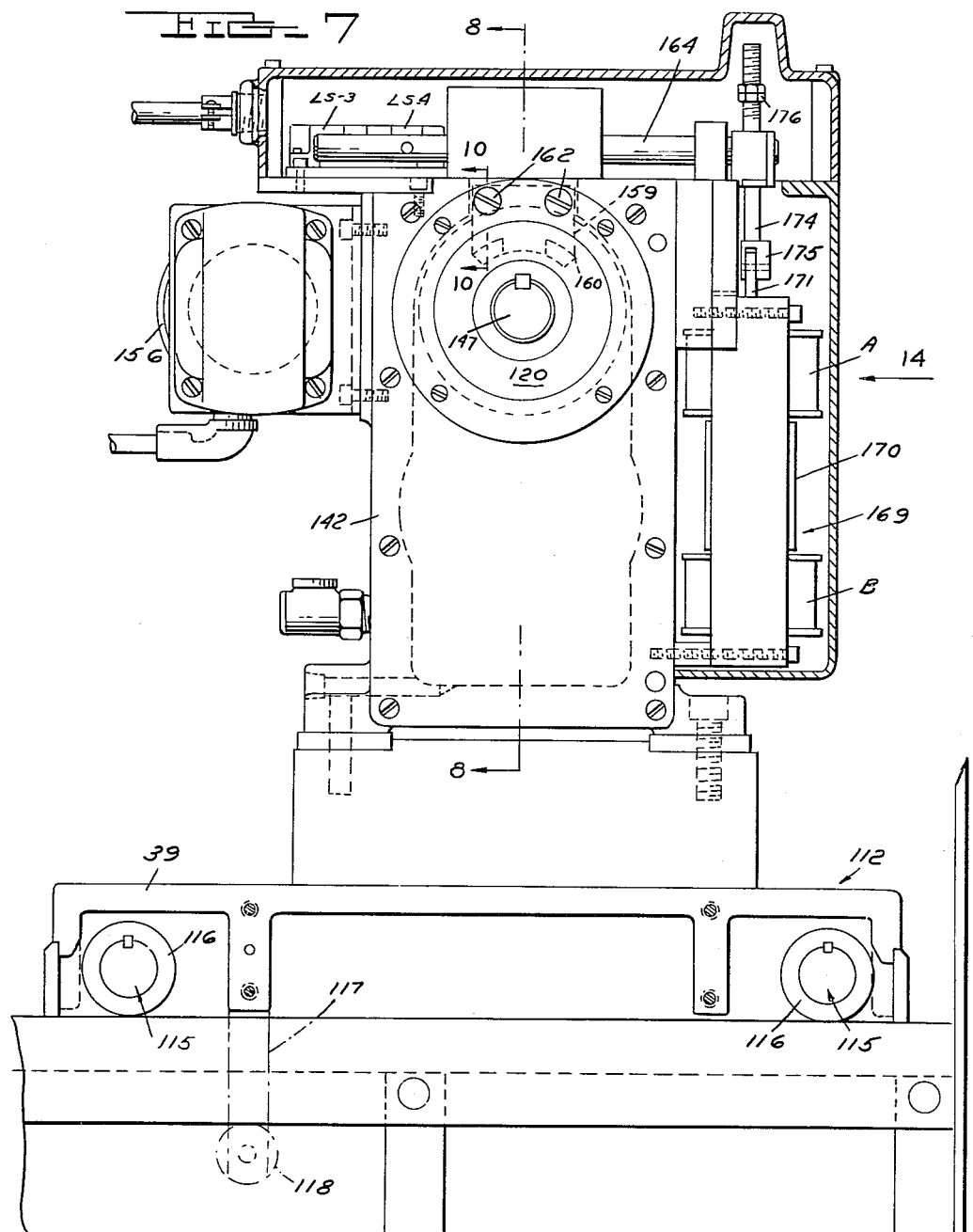

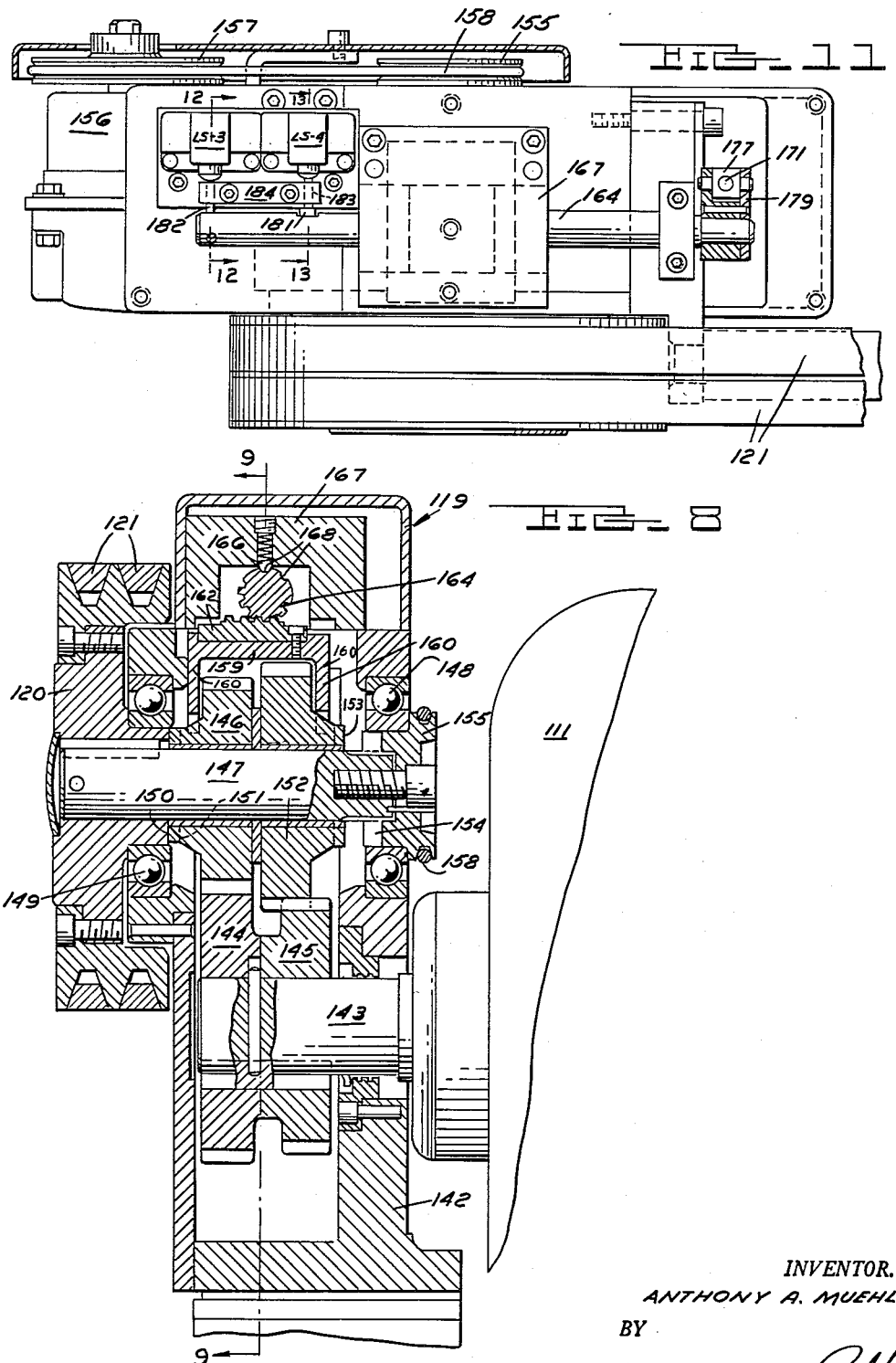

April 10, 1956 A. A. MUEHLING 2,741,070
SWING GRINDER
Filed March 30, 1953 16 Sheets-Sheet 9
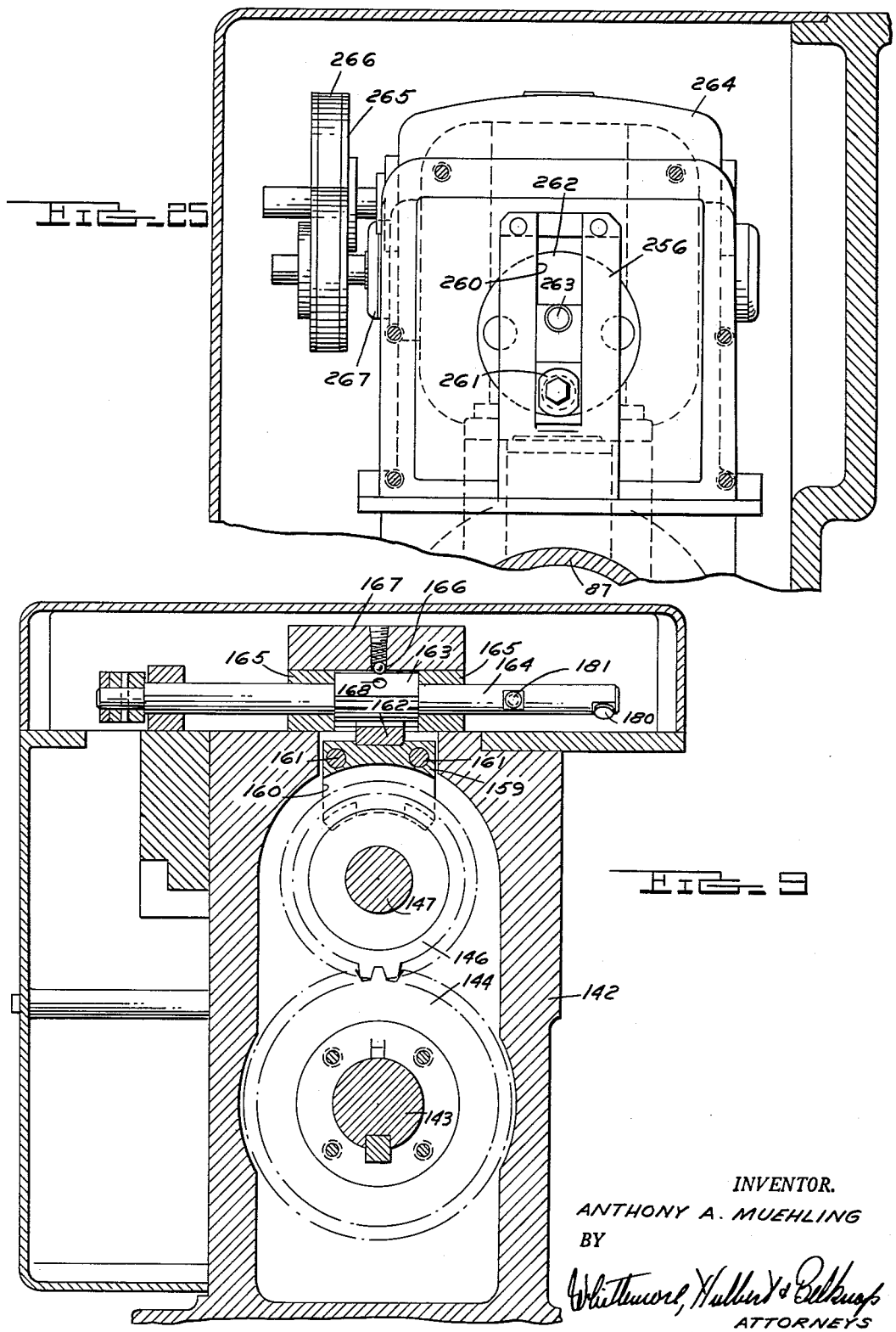
INVENTOR.
ANTHONY A. MUEHLING
BY
ATTORNEYS

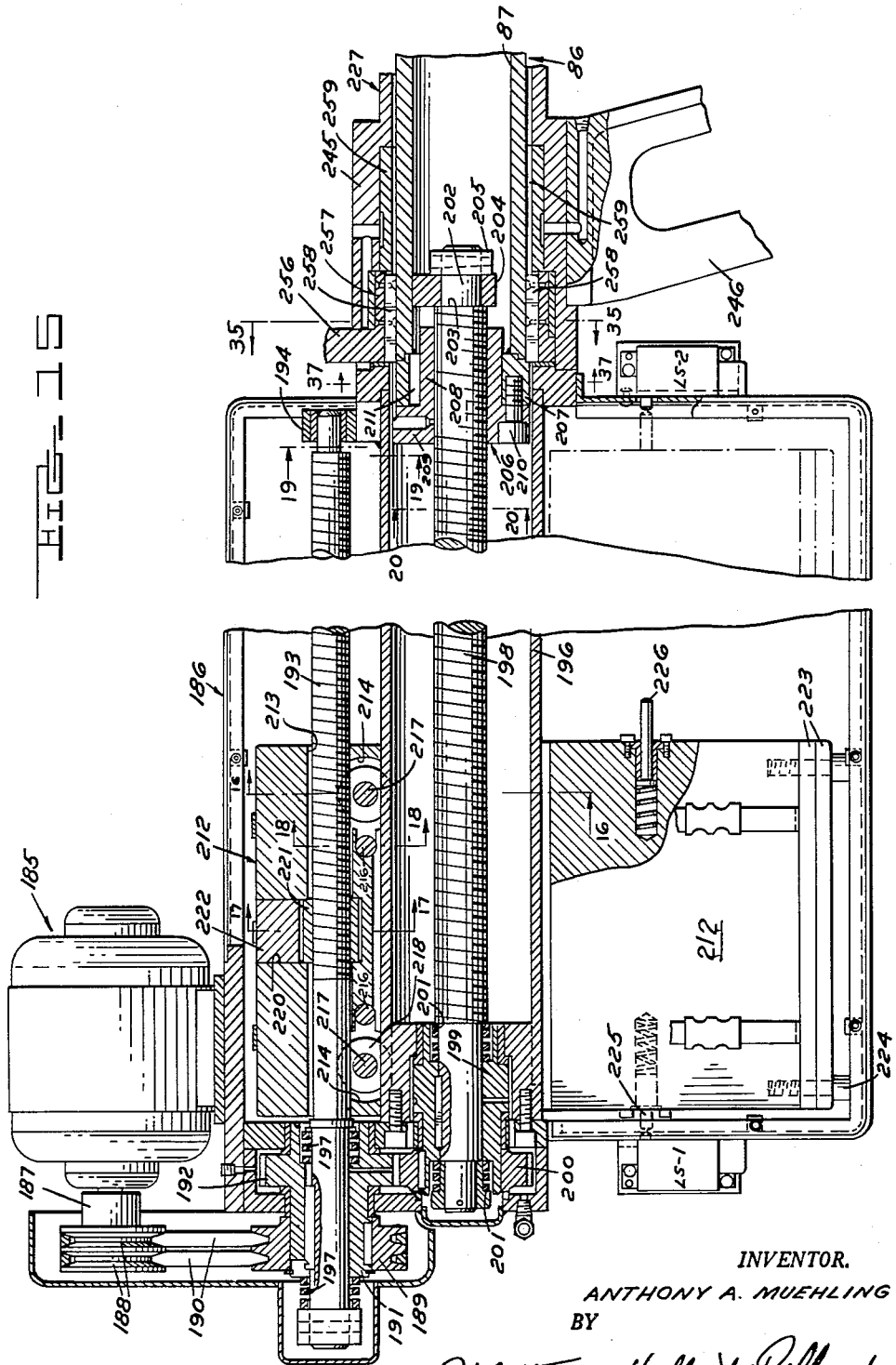

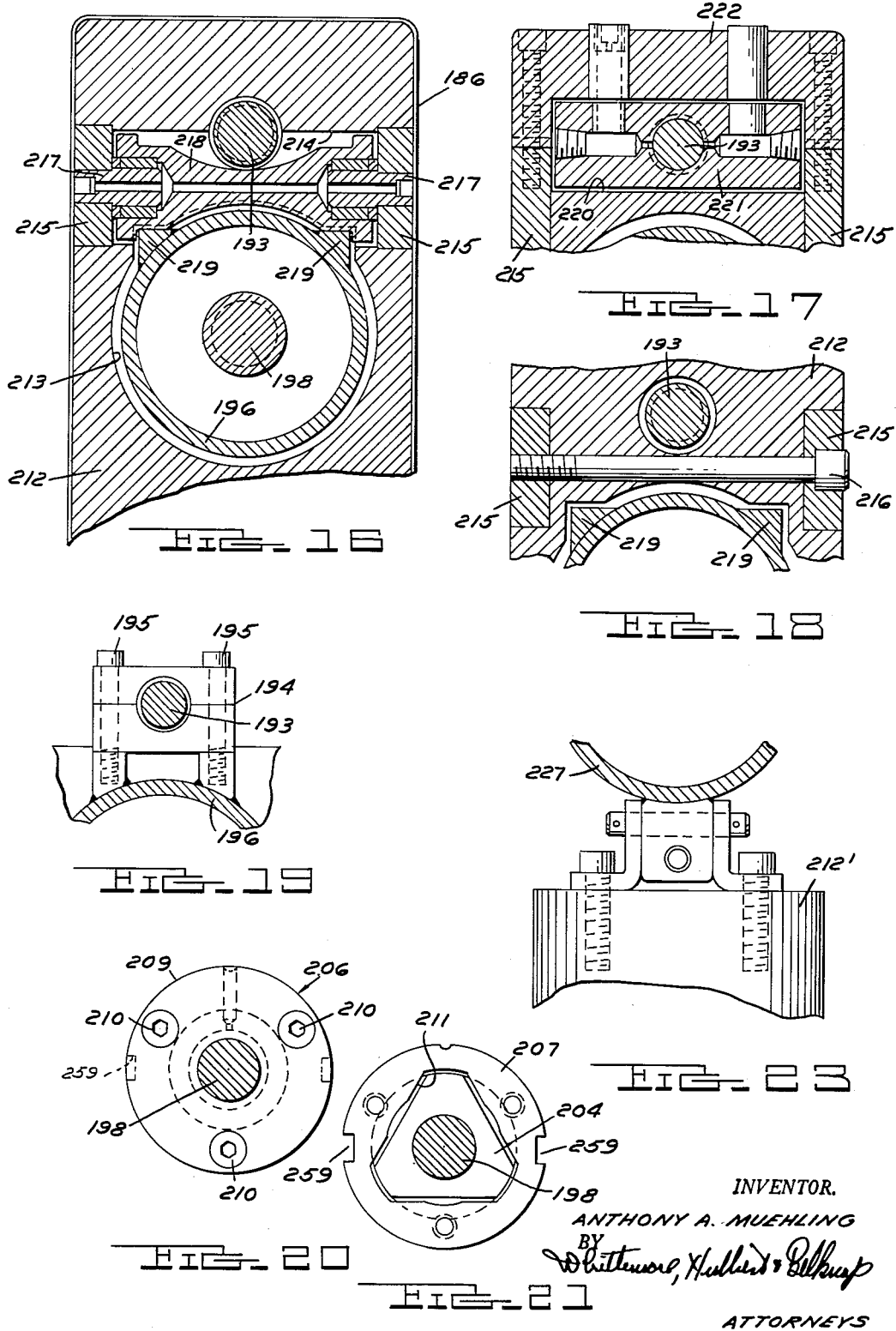

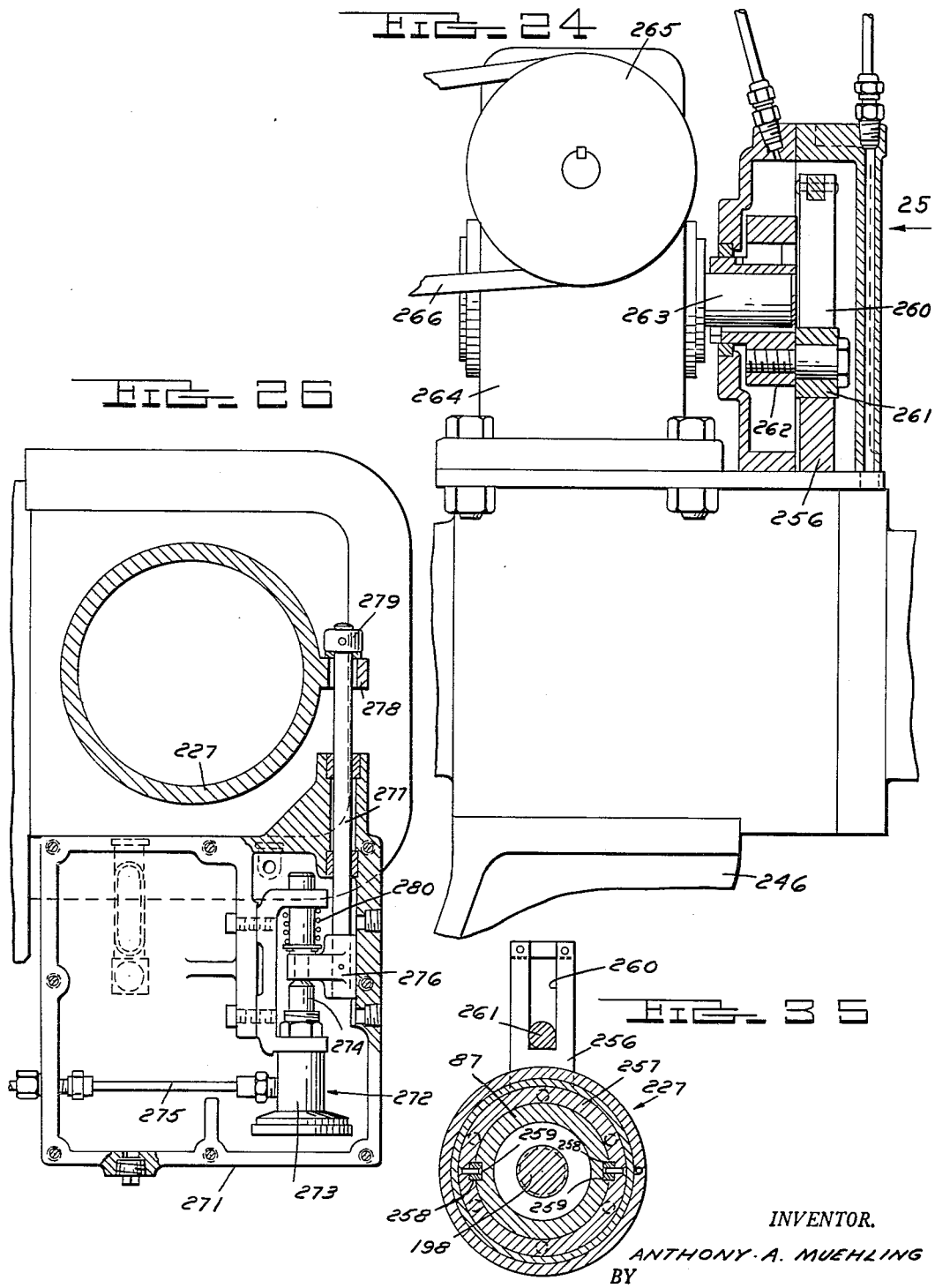

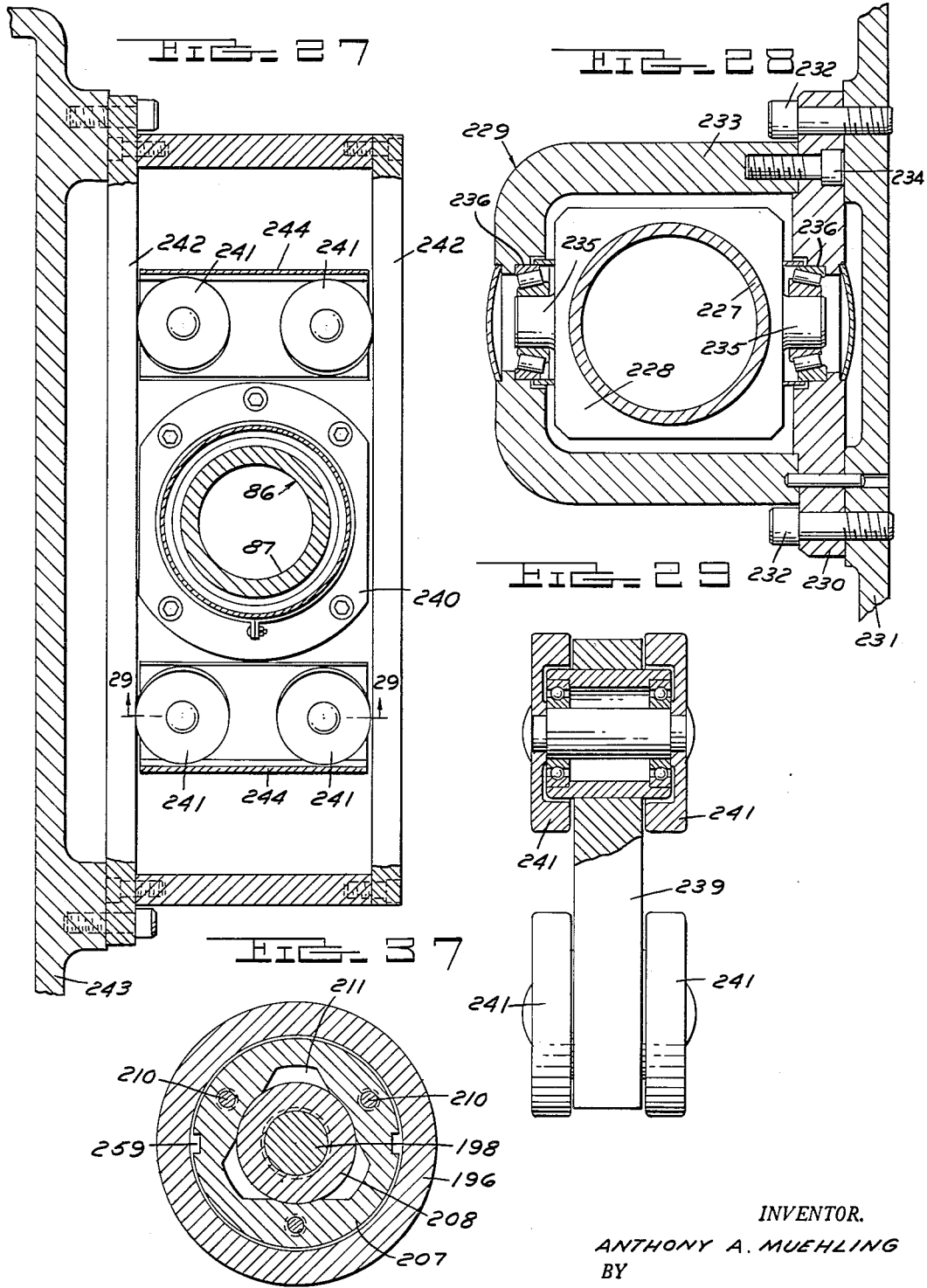

April 10, 1956     A. A. MUEHLING     2,741,070
SWING GRINDER
Filed March 30, 1953     16 Sheets-Sheet 14
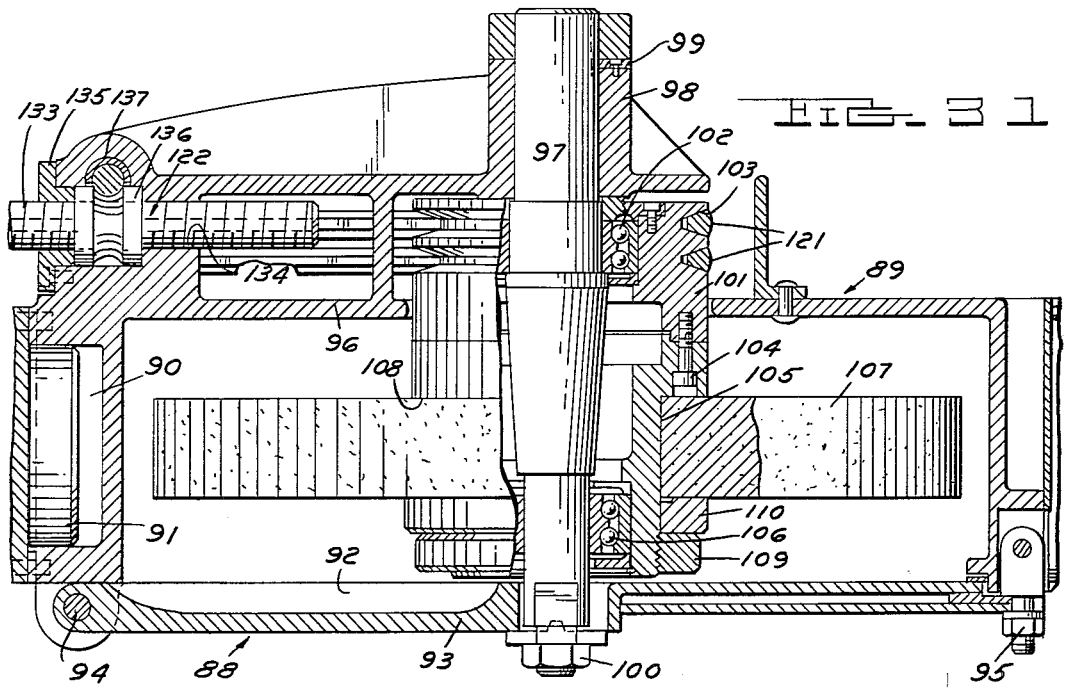
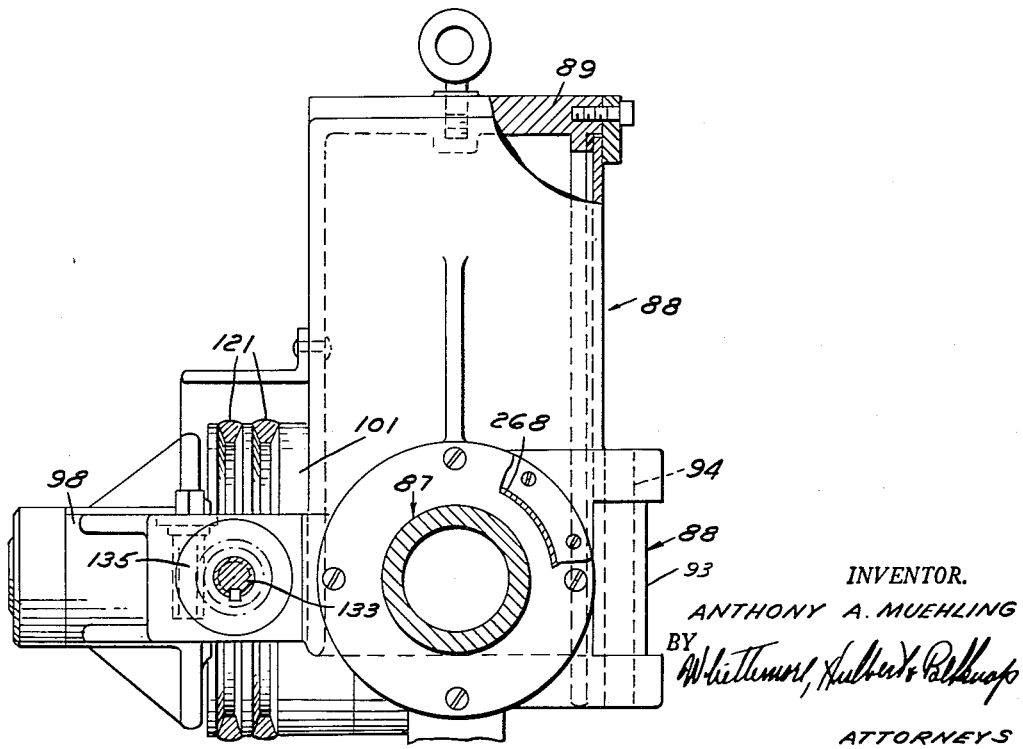
INVENTOR.
ANTHONY A. MUEHLING
BY
ATTORNEYS

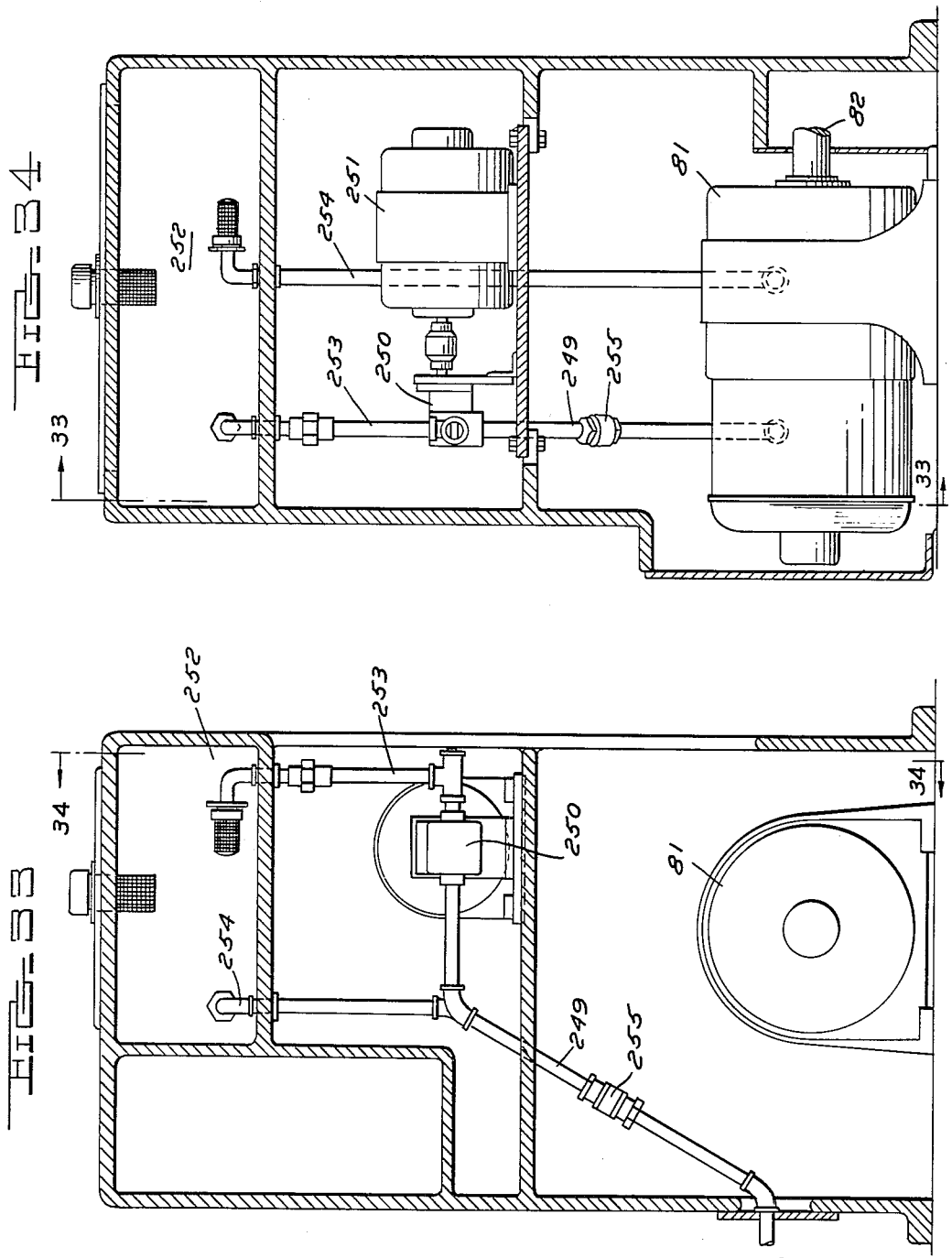

April 10, 1956   A. A. MUEHLING   2,741,070
SWING GRINDER
Filed March 30, 1953   16 Sheets-Sheet 16

INVENTOR.
ANTHONY A. MUEHLING
BY
Whittemore, Hulbert & Belknap
ATTORNEYS

United States Patent Office 2,741,070
Patented Apr. 10, 1956

2,741,070

SWING GRINDER

Anthony A. Muehling, Detroit, Mich., assignor to Mid-West Abrasive Company, Owosso, Mich., a corporation of Delaware Application March 30, 1953, Serial No. 345,484

18 Claims. (Cl. 51—32)

This invention relates generally to machine tools, and refers more particularly to an improved swing grinder of the type commonly used for grinding metal billets of substantial length.

It is an object of the present invention to provide a grinding machine having a carriage movable along a track and having an abrasive wheel rotatably mounted on the free end of a boom with its axis extending in the direction of travel of the carriage along the track. In accordance with the present invention, the boom is supported by the carriage for sliding movement in directions to feed the abrasive wheel transversely of the work piece from one side edge of the latter to the other and for rotation in opposite directions about the axis of the boom to tilt the axis of the abrasive wheel in opposite directions.

It is another object of this invention to provide a construction wherein the abrasive wheel may be manually or automatically tilted during the grinding operation. As a result the abrasive wheel is maintained in a properly dressed condition throughout the grinding operation.

It is still another object of the present invention to counterbalance the boom and associated parts including the abrasive wheel with a weight movable in opposed relationship to the transverse feeding movement of the abrasive wheel in order to maintain the desired grinding pressure on the work piece throughout the grinding operation.

It is a further object of the present invention to provide the grinding machine with means for selectively varying the speed of rotation of the abrasive wheel in order to assure rotation of the latter at the required peripheral speed to secure the desired abrasive action regardless of reduction in diameter of the abrasive wheel caused by wear.

It is a still further object of the present invention to provide a grinding machine of the foregoing type having improved means for swinging the boom vertically to selectively move the abrasive wheel into and out of engagement with the work piece.

The foregoing as well as other objects will be made more apparent as this description proceeds especially when considered in connection with the accompanying drawings, wherein:

Figure 1 is a side elevational view of a swing grinder constructed in accordance with the present invention;

Figure 2 is an elevational view of the side of the swing grinder opposite the side shown in Figure 1;

Figure 3 is a plan view of the swing grinder shown in Figures 1 and 2;

Figure 4 is a cross sectional view taken on the line 4—4 of Figure 1;

Figure 5 is a sectional view taken on the line 5—5 of Figure 3;

Figure 6 is a cross sectional view taken on the line 6—6 of Figure 5;

Figure 7 is a sectional view taken on the line 7—7 of Figure 4 and having certain parts broken away for the sake of clearness;

Figure 8 is a sectional view taken on the line 8—8 of Figure 7;

Figure 9 is a sectional view taken on the line 9—9 of Figure 8;

Figure 10 is a sectional view taken on the line 10—10 of Figure 7;

Figure 11 is a top plan view partly in section of a part of the grinder shown in Figures 1 and 2;

Figure 12 is a cross sectional view taken on the line 12—12 of Figure 11;

Figure 13 is a cross sectional view taken on the line 13—13 of Figure 11;

Figure 14 is an elevational view looking in the direction of the arrow 14 in Figure 7 and having certain parts broken away for the sake of clearness;

Figure 15 is a sectional view taken on the line 15—15 of Figure 3;

Figure 16 is a cross sectional view taken on the line 16—16 of Figure 15;

Figure 17 is a sectional view taken on the line 17—17 of Figure 15;

Figure 18 is a sectional view taken on the line 18—18 of Figure 15;

Figure 19 is a cross sectional view taken on the line 19—19 of Figure 15;

Figure 20 is a cross sectional view taken on the line 20—20 of Figure 15;

Figure 21 is a view similar to Figure 20 having the nut removed;

Figure 22 is a sectional view taken on the line 22—22 of Figure 3;

Figure 23 is a fragmentary and elevational view partly in section of a detail of the grinding machine;

Figure 24 is a side elevational view partly in section of a part of the grinding machine shown in Figure 2;

Figure 25 is an elevational view looking in the direction of the arrow 25 in Figure 24 and having certain parts broken away for the sake of clearness;

Figure 26 is a sectional view taken on the line 26—26 of Figure 2;

Figure 27 is a sectional view taken on the line 27—27 of Figure 22;

Figure 28 is a cross sectional view taken on the line 28—28 of Figure 2;

Figure 29 is a sectional view taken on the line 29—29 of Figure 27;

Figure 30 is a sectional view taken on the line 30—30 of Figure 3;

Figure 31 is a sectional view taken on the line 31—31 of Figure 1;

Figure 32 is a sectional view taken on the line 32—32 of Figure 1;

Figure 33 is a sectional view taken on the line 33—33 of Figure 34;

Figure 34 is a sectional view taken on the line 34—34 of Figure 33;

Figure 35 is a sectional view taken on the line 35—35 of Figure 15; and

Figure 37 is a fragmentary sectional view taken substantially on the line 37—37 of Figure 15.

Figure 36:
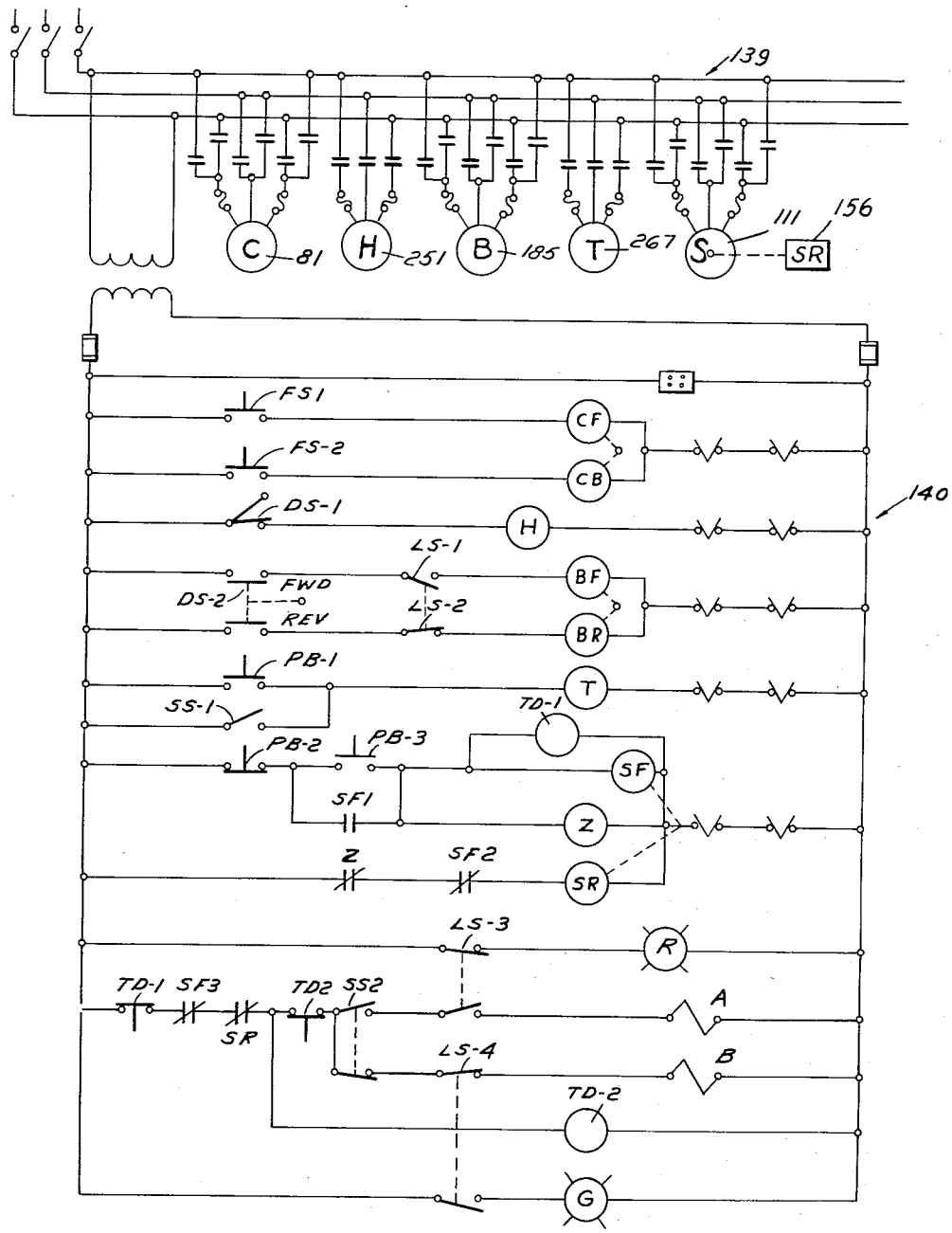
Figure 36 is an electrical diagram of the controlling circuit for the grinding machine.

The metal removing machine selected for the purpose of illustrating the present invention is adapted to remove metal by an abrasive action and comprises a swing grinder. Referring first to Figures 2 and 5 of the drawings, it will be noted that the swing grinder has a supporting structure which includes a track 35 and a carriage 36 supported on the track 35 for movement in opposite directions along the latter.

The track 35 comprises laterally spaced rails 37 and 38 suitably anchored to flooring or other supporting means, not shown herein. The rails 37 are generally I-shaped in cross section and the rails 38 have an inverted channel-shaped cross section.

The carriage 36 comprises a platform 39 rectangular in shape and having flanges 40 depending from opposite sides thereof. As shown in Figure 4 of the drawings, a pair of axles 41 and 42 are respectively supported on the carriage at opposite ends of the latter. The axle 41 is a driving axle and is shown in detail in Figure 5 of the drawings. More particularly, the axle 41 comprises axially aligned tubes 43 and 44 having the inner ends spaced from each other and connected together by a coupling 45. The outer end of the tube 43 is secured to a part 46 having a cylindrical surface 47 concentric with the tube 43 and having a radially outwardly extending flange 48 at the inner end of the surface 47. The cylindrical surface 47 forms a pilot on which a flanged wheel 49 is supported and having the peripheral surface thereof engageable with the rail 37 of the track 35. The flanged wheel 49 is secured to the flange 48 on the part 46 by studs 50 so that the wheel 49 rotates as a unit with the tube 43. A stub shaft 51 is secured to the adjacent depending flange 40 of the platform 39 in axial alignment with the tube 43. The inner end of the stub shaft projects into a counterbored recess 52 in the part 46 and a roller bearing 53 is supported within the recess 52 for engagement with the inner end of the stub shaft 51. The arrangement is such that the outer end of the tube 43 is journaled on the stub shaft 51 and the weight of the carriage is transmitted directly to the track 35 through the wheel 49. Axial outward movement of the stub shaft 51 relative to the adjacent flange 40 is prevented by a cap 54 independent of shaft 51 and secured to the flange 40 aforesaid by suitable studs 55.

The outer end of the tube 44 is secured to a part 56 having a cylindrical surface 57 and having a radially outwardly extending flange 58 at the inner end of the surface 57. A wheel 59 is mounted on the surface 57 and is secured to the flange 58 by suitable studs 60. The peripheral surface of the wheel is engageable with the head of the rail 38 and is cylindrical to enable lateral shifting movement of the wheel 59 relative to the rail 38. The outer end of the part 56 is counterbored to provide a recess 61 and a roller bearing 62 is supported within the recess 61. The bearing 62 forms a journal for the inner end of a stub shaft 63 which is secured to the adjacent flange 40 on the carriage 36. Axial displacement of the stub shaft 63 in an outward direction is prevented by a cap 64 independent of shaft 63 and secured to the adjacent flange 40 by studs 65. It will be noted from the foregoing that the two carriage wheels 49 and 59 may be readily replaced when necessary by the mere removal of the stub shafts 51, 63 and the studs 50, 60.

The coupling 45 comprises a part 66 secured to the inner end of the tube 43 and a part 67 secured to the inner end of the tube 44. The two coupling parts are arranged in axial alignment with each other and with the tubes 43 and 44. The coupling part 67 is recessed at the inner end for telescopically engaging the outer end of the coupling part 66, and the two parts are secured together by a tie rod 68 which extends axially through the tube 44. It will be noted from Figure 5 of the drawings that the inner end of the tie rod extends through a bore in the part 67 and threadably engages the coupling part 66. The tie rod 68 also extends axially through a bore formed in the part 56 at the outer end of the tube 44, and the bore in said part 56 has a shoulder for engagement with the head 69 on the outer end of the tie rod. A pin 70 serves to secure the tie rod 68 to the tube 44 and prevent relative rotation therebetween. The construction is such that the coupling 45 may be readily assembled and disassembled when desired.

Referring again to Figure 5 of the drawings, it will be noted that the two coupling members 66 and 67 respectively project through openings formed in the opposite side walls of a housing 71 which is secured to the underside of the platform 39. The coupling part 66 is journalled in the adjacent wall of the housing by a ball bearing 72 and suitable seals 73 are provided to prevent the escape of lubricant from the housing.

Located within the housing 71 and keyed to the coupling part 66 adjacent the bearing 72 is a pinion 74 having teeth 75 on the periphery and having clutch teeth 76 on the side thereof adjacent the tube 44 for engagement with cooperating teeth 77 on the coupling part 67. The teeth 75 on the pinion 74 mesh with a gear 78 which extends into the housing 71 through a clearance opening provided in the platform 39 and which is journalled on a stub shaft 79. The stub shaft 79 is suitably secured to frame structure 80 on the carriage 36, and the gear 78 on the stub shaft 79 is driven by a reversible electric motor 81 suitably secured to the platform 39. The reversible electric motor 81 has a drive shaft 82 and a pinion 83 is secured to the drive shaft 82 in a position to mesh with the gear 78. The arrangement is such that rotation of the motor 81 in opposite directions propels the carriage 36 in opposite directions along the track 35.

The axle assembly 42 for supporting the end of the carriage 36 opposite the driving axle 41 is not shown in detail herein. However, the axle 42 may be the same in construction as the axle 41 with the exception that no provision need be made for driving the axle 41. In any case it will suffice to point out that the axle 42 rotatably supports a pair of wheels in positions to respectively engage the rails 37 and 38 of the track 35.

The electric motor 81 is connected in a power circuit 139 and is controlled by a pair of switches FS–1 and FS–2 shown in Figures 1 and 36 of the drawings as connected in a control circuit 140. The switches aforesaid are mounted on the carriage 36 for convenient manipulation by the feet of an operator while in a seated position on a seat 84. The seat 84 is mounted on the top of a vertical pedestal 85 suitably secured to the carriage 36 so that the operator travels along with the carriage.

The switches FS–1 and FS–2 are normally open as shown in Figure 36. Closing of the switch FS–1 energizes the contactor CF and closes the electric circuit to the motor 81 in a manner such that the latter rotates in a direction to move the carriage 36 forwardly along the track 35. Closing of the switch FS–2 energizes the contactor CB and reverses the direction of rotation of the motor 81 to propel the carriage 36 in a rearward direction along the track 35. In practice the work piece W to be operated upon is supported to one side of the track as shown in Figure 1 of the drawings so that the carriage 36 is movable in opposite directions lengthwise of the work piece W.

The numeral 86 indicates a boom assembly which is mounted on the carriage 36 and which extends outwardly from the carriage at right angles to the track 35 over the top of the work piece W, as shown in Figure 1 of the drawings. The boom assembly 86 includes an elongated tube 87 supported at the inner end on the carriage in a manner to be more fully hereinafter described and having an abrasive wheel assembly 88 mounted on the outer end thereof. The abrasive wheel assembly 88 is shown in Figure 31 as having a housing 89 formed with a circular recess 90 in the inner end wall thereof for receiving the outer end of a plug 91 having the inner end secured to the outer end of the tube 87. Thus, the housing 89 is secured to the outer end of the boom tube 87 and is movable as a unit with the latter. One side 92 of the housing 89 is open and is normally closed by a cover or guard 93 having the inner edge pivoted to the housing by a pin 94, in a manner such as to permit outward swinging movement of the cover relative to the housing. The outer swinging edge of the cover 93 is normally secured to the housing by a releasable latch 95.

The wall 96 of the housing 89 opposite the cover 93 is fashioned to support a spindle 97 with its axis extending at right angles to the axis of the boom tube 87. In detail, the wall 96 of the housing 89 is fashioned with a sleeve part 98 for receiving one end of the spindle 97 and the latter is secured to the sleeve part by a key 99. The spindle 97 extends from the sleeve part 98 axially through the housing 89 and the central portion of the cover 93 is apertured to receive the free end of the spindle. It will be noted from Figure 31 that the free end of the spindle is threaded and the central portion of the cover 93 is clamped to the spindle by a nut 100.

Referring again to Figure 31 of the drawings, it will be noted that a pulley 101 is journaled on the spindle 97 by a ball bearing 102 and the periphery of the pulley is formed with a pair of axially spaced annular belt receiving grooves 103. The axially inner end of the pulley 101 is secured by studs 104 to the adjacent end of a ring 105 having a reduced part concentric to the spindle 97 and journaled on the spindle by a ball bearing 106. An abrasive wheel 107 is sleeved on the reduced portion of the ring 105 and is seated against the radially extending shoulder 108 formed by the reduced portion of the ring. The abrasive wheel 107 is secured in place on the ring 105 by an annular nut 109 which is threaded on the axially outer end of the ring 105. An annular spacer 110 is supported on the ring 105 between the nut 109 and the abrasive wheel 107. With the above construction, it will be noted that the spindle 97 and associated parts may be readily installed or replaced when desired. It will also be noted that the abrasive wheel 107 may be replaced by the mere swinging of the cover 93 to its open position and removing the clamping nut 109.

The abrasive wheel 107 is rotated by an electric motor 111 (Figures 3 and 4) mounted on a carriage 112 which in turn is supported by a track 113 having laterally spaced rails 114 extending parallel to the axis of the boom tube 87. More particularly, the carriage 112 is equipped with axles 115 having rollers 116 positioned on opposite ends thereof for rolling engagement with the respective rails 114. As shown particularly in Figure 4, the carriage 112 is held in position on the track 113 by suitable brackets 117 secured to opposite sides of the carriage 112 and having rollers 118 at the lower ends thereof respectively engageable with the bottom sides 114. The above arrangement is such that the carriage 112 with the motor 111 thereon is movable in the direction of the axis of the boom between the broken and full line positions shown in Figure 3 of the drawings.

The drive shaft of the electric motor 111 is connected to a change speed device 119 suitably mounted on the carriage 112 and having a pulley 120 secured to the power output shaft thereof. The pulley 120 has a pair of axially spaced annular grooves therein for receiving the inner ends of a pair of belts 121. The outer ends of the belts 121 are respectively received in the grooves 103 of the pulley 101 so that rotation of the motor 111 imparts a rotative movement to the abrasive wheel 107.

As will be presently described, the boom tube 87 is movable in opposite directions lengthwise thereof in order to feed the abrasive wheel 107 back and forth across the work W. In the present instance, the carriage 112 is movable as a unit with the boom tube 87 during the feeding traverse of the abrasive wheel 107. For accomplishing this result, a tie rod assembly 122 (Fig. 30) is provided between the carriage 112 and the abrasive wheel housing 89. The tie rod assembly 122 comprises a plurality of axially aligned relatively movable parts and performs the additional result of maintaining the proper tension on the belts 121. Referring more in detail to Figure 30, sheet 1, of the drawings, it will be noted that the tie rod assembly 122 has a pair of central rod sections 123 suitably fashioned at the adjacent ends to overlie and interlock with one another. The rod sections 123 are held in their assembled relationship shown in Figure 30 by a sleeve 124 normally extending over the joint between the overlying rod sections and frictionally held by a detent 125 against a stop in the form of a tapered pin 126. The sleeve 124 is movable axially of the tie rod 122 in a direction away from the stop 126 to enable disengaging the adjacent ends of the rod sections 123 and thereby permit replacing the belts 121 when desired. The axially outer ends of the rod sections 123 are formed with recesses 127 for respectively receiving the inner ends of coil springs 128. The axially outer end of one of the coil springs 128 extends into a recess 129 formed in a part 130 which is secured to a lug 131 projecting laterally from the speed changer 119 on the carriage 112. The outer end of the other coil spring 128 seats in a recess 132 formed in the axially inner end of a part 133 of the assembly 122. Referring now to Figure 31, it will be noted that the axially outer end of the part 133 is externally threaded and projects into a bore 134 formed in the housing 89, being keyed against rotation relative thereto. The inner end of the bore 134 is closed by a cap 135 which loosely receives the part 133. A feed nut 136 is threaded on the part 133 and is arranged to mesh with a worm 137 suitably journalled in the housing 89. The arrangement is such that rotation of the worm 137 imparts a rotative movement to the feed nut 136 which in turn axially shifts the threaded part 133 to effect the desired adjustment. Attention is again called to Figure 30 wherein it will be noted that the parts 130 and 133 are respectively encircled by coil springs 138 having the convolutions adjacent the outer ends thereof respectively engaged in helical grooves formed in the aforesaid parts and having the convolutions adjacent the inner ends thereof respectively lying in helical grooves formed in the rod sections 123. The coil springs 138 are under tension and the extremities thereof may be tack welded in place to provide the necessary tie between the parts 130 and 133 of the tie rod assembly 122. The resilient connection between the boom and the wheel motor carriage 112 prevents the latter from undue shocks which might otherwise occur upon a reversal of boom travel.

As shown in the diagram in Figure 36 of the drawings, the motor 111, like the motor 81, is electrically connected in a power circuit 139 and is controlled by a control circuit 140. In the present instance, the circuit to the motor 111 is closed by a push button switch PB-3 and is opened by a similar push button switch PB-2. Referring more particularly to Figure 36, it will be noted that closing of the start switch PB-3 energizes the time delay contactor TD-1 and the contactor SF to close the circuit to the motor 111. The circuit to the motor 111 is maintained closed upon release of the switch PB-3 by the contacts SF1 which close in response to energizing the contactor SF. Also closing of the contacts SF-1 energizes the lockout coil Z of the zero speed switch and starts the motor 111. Opening of the stop switch PB-2 de-energizes the contactor TD-1, the contactor SF and the coil Z to thereby discontinue rotation of the spindle motor 111. It will be noted that the push button switches PB-2 and PB-3 are respectively mounted on a panel 141 secured to the carriage 36 in a position to render said switches operable from a position on the seat 84. It will be noted that the letters identifying the relays in the control circuit are also applied to the corresponding power units.

It is pointed out at this time that when the diameter of the abrasive wheel 107 changes due to wear, it is desirable to change the speed of rotation of the abrasive wheel in order to maintain a more or less uniform peripheral speed. This is accomplished by the variable speed mechanism 119 previously described as mounted on the carriage 112. The mechanism 119 is more clearly shown in Figures 8 and 9 of the drawings. In detail, the variable speed mechanism 119 comprises a housing structure 142 and the inner wall of the housing is apertured to receive the drive shaft 143 of the motor 111. A pair of gears 144 and 145 are secured to the drive shaft 143 in side by side relationship. The gear 144 is of greater diameter than the gear 145 and meshes with a relatively small diameter gear 146 which is rotatably supported on a shaft 147. The inner end of the shaft 147 is rotatably supported by a ball bearing 148 secured to the inner wall of the housing 142 and the outer end of the shaft 147 projects through an opening in the outer wall of the housing 142 to enable securing the pulley 120 thereto. A ball bearing 149 rotatably supports the pulley 120 on the outer wall of the housing and hence also provides a support for the outer end of the shaft 147.

The outer side of the gear 146 is formed with a series of radially extending clutch teeth 150 and these teeth are shown in Figure 8 of the drawings as engaging cooperating clutch teeth 151 on the pulley 120. The arrangement is such that the motor 111 is connected to the abrasive wheel 107 through the gearing 144, 146 to drive the abrasive wheel at high speed.

The relatively small gear 145 on the motor shaft 143 meshes with a somewhat larger gear 152 rotatably supported on the shaft 147 adjacent the gear 146 and having a series of radially extending clutch teeth 153 at the inner side for engagement with corresponding teeth 154 on a pulley 155. The pulley 155 is secured to the inner end of the shaft 147 and is journaled in the ball bearing 148. The purpose of pulley 155 will be more fully hereinafter described. In the present instance, the gears 146 and 152 move axially of the shaft 147 as a unit to alternately engage the clutch teeth 150, 151 and the clutch teeth 153, 154. As stated above, engagement of the clutch teeth 150, 151 connects the abrasive wheel 107 to the spindle motor 111 through the speed increasing gearing 144, 146. On the other hand, movement of the gears 146 and 152 inwardly from the position thereof shown in Figure 8 of the drawings disengages the clutch teeth 150, 151 and engages the clutch teeth 153, 154. As a result the spindle motor shaft 143 is connected to the abrasive wheel 107 through the medium of the reduction gear 145, 152. Hence the abrasive wheel 107 is rotated at a somewhat lower speed.

In order to facilitate shifting movement of the gears 146, 152 to their respective operative positions noted above, a zero speed plugging switch 156 (Fig. 11) is provided. The switch 156 is operated by a pulley 157 which is connected to the pulley 155 by a belt 158. Thus the switch 156 is operated by the shaft 147 to bring the speed of the motor shaft 143 within a range more suitable for changing the ratio of the drive between the motor shaft 143 and spindle 97. The plugging switch 156 is not shown in detail herein as it may be of any one of a number of designs available to the trade.

The gearing 146, 152 is shifted back and forth along the shaft 147 by a shifting fork 159 (Figs. 8 and 9) having depending fingers 160 respectively positioned at the outer side of the gear 146 and at the inner side of the gear 152. As shown particularly in Figure 9, the shifting fork 159 is slidably supported on laterally spaced rails 161 suitably secured to the housing 142, and a rack 162 is secured to the top of the shifting fork. The rack 162 extends parallel to the shaft 147 and meshes with a pinion 163 formed integral with a shaft 164 intermediate the ends thereof. The shaft 164 is journalled in bearings 165 suitably secured to the top of the housing 142 at opposite sides of the pinion 163 and a spring influenced detent 166 is supported on a part 167 in a position to successively engage in recesses 168 in the shaft. The recesses 168 are spaced circumferentially of one another and are arranged to frictionally hold the shaft 164 in the extreme angular positions of the shaft wherein one or the other of the gears 146, 152 are connected to the shaft 147. It follows from the above that rocking movement of the shaft 164 in opposite directions operates the shifting fork 159 to slide the gears 146, 152 as a unit in opposite directions on the shaft 147 to either increase or decrease the speed of rotation of the abrasive wheel 107.

The shaft 164 is rotated in opposite directions to operate the shifting fork 159 by a double acting solenoid 169 (Figs. 7, sheet 7, and 14, sheet 4) having two coils A and B supported in vertically spaced relationship on a bracket 170. A core member 171 is slidably supported on the bracket 170 in operative relationship to the solenoid coils A and B. As shown particularly in Figure 14, the core member 171 has an enlargement 172 intermediate the coils and slidably engageable with vertical guides 173 carried by the bracket 170. It will also be noted that the upper end of the core member 171 projects through the top coil A and is pivotally connected to the lower end of a rod 174 by a clevis 175. The upper end of the rod 174 is threaded and a stop 176 is threadably secured to the upper end of the rod for adjustment axially of the rod. A sleeve 177 is slidably supported on the rod 174 and is yieldably held in an intermediate position on the rod 174 by a pair of coil springs 178 surrounding the rod at opposite ends of the sleeve 177. It will be noted from Figure 14 that the adjacent inner ends of the coil springs engage the sleeve 177 and the outer ends respectively abut the clevis 175 and the stop 176.

As shown in Figures 11 and 14, the sleeve 177 is pivoted to the outer end of a link 179 having the opposite end secured to the inner end of the shaft 164. Thus movement of the core member 171 in opposite directions actuates the shifter fork 159 to move the gearing 146, 152 in opposite directions on the shaft 147 (Fig. 8) to change the speed of the abrasive wheel 107.

As shown in Figures 11, 12 and 13 of the drawings, the outer end portion of the shaft 164 is provided with axially spaced cams 180 and 181 for respectively operating plungers 182 and 183. The plungers 182 and 183 are slidably supported in a part 184 which is suitably secured to the top of the housing 142. The plunger 182 operates a limit switch LS-3 and the plunger 183 operates a limit switch LS-4. The limit switch LS-3 is shown in the diagram (Fig. 36) as connected in a circuit with a signal light R which may be red in color and is supported on the panel 141 of the machine as shown in Figure 1 of the drawings. The limit switch LS-4 is shown in the diagram (Fig. 36) as connected in an electric circuit with a signal light G which may be green in color and is supported on the panel 141, shown in Figure 1 of the drawings. In the present instance, the signal light R indicates to the operator that the abrasive wheel 107 is rotating at a slow speed and the signal light G indicates to the operator that the abrasive wheel 107 is rotating at maximum speed.

As also shown in Figure 1 of the drawings, a selector switch SS-2 is mounted on the panel 141 in a convenient position for manipulation by the operator to render the double acting solenoid 169 operative to either increase or decrease the speed of rotation of the abrasive wheel 107 through the change speed gearing in the device 119. The selector switch SS-2 is also shown in the electrical diagram (Fig. 36) and it will be noted that the switch is electrically connected in an electric circuit with the coils A and B of the double acting solenoid 169. In the position of the selector switch SS-2 shown in Figure 36 the circuit to the solenoid coil B is closed and the circuit to the solenoid coil A is open. Hence, the selector switch SS-2 is in the "fast" position in Figure 36 of the drawings, and the high speed gears 144, 146 are in mesh.

Assuming that the abrasive wheel 107 is connected to the spindle motor 111 through the medium of the slow speed gearing 145, 152 (Fig. 8) and that it is desired to increase the speed of the abrasive wheel 107, the operator moves the selector switch SS-2 to the "fast" position shown in Figure 36 of the drawings. After the selector switch SS-2 is moved to its "fast" position the push button switch PB-2 is operated to open the circuit to the spindle motor 111.

In other words, the contactors TD, SF and the coil

Z are de-energized so that the motor circuit remains open after the switch PB-2 returns to its normally closed position. However, as a result of the above operation, the contacts SF-2 and Z (Figure 36) are closed to energize the contactor SR. The contactor SR renders the plugging switch 156 operative to expedite reduction in the speed of the spindle motor 111 to a point where shifting of the gearing in the change speed device 119 may be readily accomplished. Shifting of the gearing in the change speed device 119 to accomplish high speed operation is effected by energizing the solenoid coil B. In the present instance the circuit for the solenoid coil B is maintained open by the time delay contacts TD-1 and TD-2 until the speed of the motor 111 decreases to a predetermined value. This value is determined by the setting of contact Z and when the speed of the motor 111 drops to this preset value, the contact Z opens to de-energize the contactor SR for the plugging switch. The contacts TD-1 and SR in circuit with the coil B then close to energize the contactor TD-2. This contactor TD-2 closes the contact TD-2 and energizes the coil B. It is to be noted that the contacts SF-3 of the contactor SF are closed along with the contacts SF-2 when the contactor SF is de-energized by the switch PB-2. Energizing the solenoid B rotates the shaft 164 in a direction to shift the fork 159 in a direction to release the gear 152 (Figure 8) from the clutch teeth 154 and to engage the gear 146 with the clutch teeth 151.

As shown in Figure 36 the two limit switches LS-3 and LS-4 are of the double contact type. One contact of the switch LS-3 is arranged in a circuit with the lamp R and the other contact is in the circuit of the solenoid coil A. One contact of the switch LS-4 is connected in the circuit with the lamp G and the other contact of LS-4 is connected in the circuit with the solenoid coil B. The above arrangement is such that when the shaft 164 is rotated to one extreme position by the solenoid coil B, the limit switch LS-3 is operated by the cam 180 on the shaft 164 to open the circuit to the lamp R and to close the other contact in the circuit to coil A. Also rotation of the shaft 164 to the extreme position aforesaid by the action of the solenoid coil B causes the cam 181 on the shaft 164 to close the contact of the limit switch LS-4 in circuit with the lamp G and to open the contact of the switch LS-4 in circuit with the coil B. Hence the lamp G is illuminated and the solenoid coil B is de-energized. Also the time delay contactor TD-2 is de-energized to open the contact TD-2 in the solenoid circuit and thereby maintain the solenoid circuit open until the next speed changing operation.

Upon completion of the above operations, the push button switch PB-3 may be manipulated to again close the circuit to the spindle motor 111, whereupon the abrasive wheel 107 will be rotated at increased speed. In the event it is desired to reduce the speed of the spindle motor 111, the selector switch SS-2 is moved to its "slow" position shown in Figure 36 and the sequence of operation noted above is repeated.

It has previously been stated that the boom tube 87 is movable axially in order to feed the abrasive wheel 107 back and forth across the work W. With this in view, reference is made to Figure 15 of the drawings wherein the numeral 185 indicates a reversible electric motor mounted on the top of a housing 186 suitably supported on the boom assembly 86. A pulley 187 is secured to the drive shaft of the motor 185 and is formed with axially spaced annular belt grooves 188. Driven by the pulley 187 is a pulley 189 having annular belt grooves respectively registering with the belt grooves 188 to receive a pair of belts 190. The pulley 189 is keyed or otherwise secured to the inner end of a tubular shaft 191 journalled on the housing 186 and having a gear 192 intermediate the ends thereof.

The reference character 193 indicates a screw having its axis extending parallel to the boom tube 87 and having the outer end journalled in a bearing supported in a sectional bearing block 194 located within the housing 186. As shown in Figure 19 of the drawings, the cooperating sections of the bearing block 194 are clamped together by studs 195 and the latter also serve to secure the block to a supporting tube 196 which extends through the housing 186 in coaxial relationship to the boom tube 87. The inner end of the screw 193 extends axially through the tubular shaft 191 and is keyed or otherwise secured to the shaft 191. Shock absorbing coil springs 197 are provided between the screw 193 and opposite ends of the tubular shaft 191 in a manner to absorb axial thrust of the screw 193.

A second screw 198 extends axially of the supporting tube 196 and the inner end of the screw 198 has a tubular shaft 199 secured thereto. The tubular shaft 199 is journalled on the tube 196 and has a gear 200 secured to the inner end thereof in a position to mesh with the gear 192. Thus the two screws 193 and 198 are rotated in opposite directions by the electric motor 185. It will also be noted from Figure 15 of the drawings that coil springs 201 are provided between the screw 198 and opposite ends of the tubular shaft 199 in order to absorb axial thrust of the screw 198.

The outer end of the screw 198 projects into the inner end of the boom tube 87 and has a reduced portion 202 providing a radially extending shoulder 203 on the screw 198. The reduced portion 202 projects through an opening formed in a guide 204 which is triangular in shape and is slidably supported in the boom tube 87 adjacent the inner end thereof. A fastener element 205 is secured to the reduced end 202 of the screw 198 at the outer side of the guide 204 and cooperates with the shoulder 203 to secure the outer end of the screw 198 to the guide 204.

Referring again to Figure 15 of the drawings, it will be noted that a nut 206 is secured to the inner end of the boom tube 87 through the medium of a coupling member 207 (Fig. 21, sheet 11) welded or otherwise fixed to the inner end of the boom tube 87. The nut 206 has a tubular part 208 threaded on the screw 198 and has a flange 209 extending radially outwardly from the inner end thereof. The flange 209 is secured to the inner side of the coupling member 207 by studs 210 and the tubular part 208 extends axially through a central opening 211 in the coupling member 207. The opening 211 is triangular in shape to provide the necessary clearance for the tubular nut part 208 and at the same time to afford the required metal for supporting the studs 210.

It follows from the foregoing that rotation of the screw 198 in one direction relative to the nut 206 causes the boom assembly 86 to move inwardly and rotation of the screw 198 in the opposite direction relative to the nut 206 causes the boom assembly 86 to move outwardly. As stated above, the screw 193 rotates in a direction opposite the direction of rotation of the screw 198 and the purpose of the screw 193 is to operate a counter blancing weight 212 for the boom assembly 86. As will be presently set forth the boom assembly is pivotally supported intermediate the ends for vertical swinging movement to enable raising and lowering the abrasive wheel 107 relative to the work W. The counterbalancing weight 212 enables the abrasive wheel 107 to maintain a substantially uniform pressure on the work W throughout axial feeding movement of the boom assembly 86.

With the above in view, reference is again made to Figure 15 of the drawings wherein it will be noted that the weight 212 has an opening 213 extending therethrough in parallel relationship to the supporting tube 196 for receiving the screw 193. In addition, the weight 212 also has openings 214 adjacent opposite ends and extending through the weight at right angles to the supporting tube 196. As shown in Figure 16, the opposite ends of the openings 214 are respectively closed by blocks 215 secured to opposite sides of the weight 212 by tie bolts 216, as shown in Figure 17. Referring again to Figure 16 of the drawings, it will be noted that rollers 218 are respectively arranged within the openings 214 with their axes extending at right angles to the tube 196 and that the opposite ends of the rollers 218 are journaled on stub shafts 217 carried by the blocks 215. The opposite ends of the rollers 218 respectively engage tracks 219 welded or otherwise secured to the tube 196 at the top of the latter. The tracks 219 extend lengthwise of the tube 196 and serve to guide movement of the weight along the tube 196.

As shown in Figures 15 and 17 of the drawings, the top of the weight 212 intermediate the ends of the latter is fashioned with a slot 220 and a nut 221 is supported within the slot 220. The nut 221 is threaded on the screw 193 and cooperates with the latter to move the weight 212 in opposite directions along the tube 196. The upper end of the slot 220 is closed by an inverted U-shaped member 222 having the leg portions secured to the blocks 215 by suitable studs. The plugged openings in the nut 221 are for lubrication.

As shown in Figures 15 and 16, a substantial mass of the weight 212 is positioned in the housing 186 below the supporting tube 196 and the numeral 223 indicates auxiliary weights that may be selectively secured to the bottom of the weight 212 by studs 224. The auxiliary members 223 enable accurately adjusting the counterbalancing weight 212 to assure maintaining a substantially uniform grinding pressure on the work W throughout the feeding movement of the abrasive wheel 107 by the boom assembly 86. It is believed obvious from the foregoing that the counterbalancing weight 212 is moved in directions opposite the directions of movement of the boom assembly 86 so that the above desired counterbalancing operation is obtained throughout the feeding stroke of the boom.

Referring again to Figure 15 of the drawings, it will be noted that a pair of limit switches LS-1 and LS-2 are respectively supported on the inner and outer walls of the housing 186. Also a pair of spring influenced plungers 225 and 226 are respectively mounted on the opposite ends of the counterbalancing weight 212 in positions to successively engage the limit switches upon movement of the weight 212 to its extreme inner and outer positions. Upon reference to Figure 36, it will be noted that the limit switches LS-1 and LS-2 are electrically connected in the control circuit 140 in a manner to control the direction of rotation of the boom feeding motor 185 in the power circuit 139. A manual double throw switch DS-2 is electrically connected in series with the limit switches LS-1 and LS-2 and is operated by a control mounted on the carriage 36 in a position adjacent the seat 84 for convenient manipulation by the operator. The arrangement is such that when the control is moved forwardly the circuit through the contactor BF (Fig. 36) is closed to the motor 185 and the latter is rotated in a direction to move the boom assembly 86 outwardly, providing of course that the limit switch LS-2 is closed by the counterbalancing weight 212. On the other hand, movement of the control rearwardly operates the DS-2 to energize the contactor BR and thereby reverses the direction of rotation of the motor 185 to feed the boom 86 inwardly, providing the limit switch LS-1 is closed. Each limit switch remains closed after being actuated by one of the plungers 225 or 226 until the other limit switch is actuated.

Reference has been made above to the fact that the boom assembly 86 is pivotally mounted intermediate the ends thereof and in this connection attention is directed to Figures 22, 27 and 28 of the drawings. It will be noted particularly from Figure 22 of the drawings that the inner end portion of the boom tube 87 is supported within a tubular housing 227 having a portion intermediate the ends supported in a block 228 which in turn is carried by a bracket 229. The bracket 229 has a plate 230 secured to a part 231 on the carriage 36 by studs 232 and has a part 233 substantially U-shaped in cross section. The leg portions of the U-shaped part 233 are secured to the plate 230 by studs 234 and the block 228 is housed within the U-shaped part 233. Projecting outwardly from opposite sides of the block 228 in axial alignment are trunnions 235 and the latter are respectively journalled in roller bearings 236 supported by the plate 230 and the base portion of the U-shaped part 233. The arrangement is such as to permit vertical swinging movement of the tube 227 together with the boom assembly 86 in directions to move the abrasive wheel 107 toward and away from the work W.

As shown in Figure 22, the outer end of the tube 227 is secured to a housing 237 having a bearing 238 therein for the boom tube 87 and having plates 239 respectively secured to the outer end thereof above and below the boom tube 87 by a cap 240. Referring more particularly to Figures 27 and 29 of the drawings, it will be noted that two pairs of rollers 241 are respectively journalled on the plates 239 at opposite sides of the latter in positions to engage laterally spaced vertically extending guide members 242. The guide members 242 are shown in Figure 27 as secured to a part 243 mounted on the carriage 36, as shown in Figure 4. Referring again to Figure 22 of the drawings, it will be noted that the guide rollers 241 are protected by a sheet metal shield 244 suitably secured to the housing 237. It follows from the above that the boom 86 is accurately guided throughout its swinging movement about the pivot axes of the trunnions 235 shown in Figure 28 of the drawings.

Referring again to Figure 15 of the drawings, it will be noted that the inner end of the tube 227 extends to a position adjacent the outer end of the supporting tube 196 and has an enlarged portion 245. An arm 246 is secured to the under side of the enlarged portion 245 and the lower end of the arm (Fig. 2) is pivotally connected to the outer end of a rod 247. Suitable lubrication passages or channels are provided in the arm 246 and tube 227. The inner end of the rod 247 is connected to a piston slidably mounted in a cylinder 248 which is secured in any suitable manner to the platform 39 of the carriage 36. The rear end of the cylinder 248 is connected to a fluid supply line 249 which is shown in Figures 33 and 34 of the drawings as connected to a pump 250. The pump 250 is driven by an electric motor 251 and the intake side of the pump is connected to a reservoir 252 by a pipe 253. The outer end of the cylinder 248 is connected to a vertical stand pipe 254 and the latter also communicates with the reservoir 252. The arrangement is such that operation of the pump 250 moves the connecting rod 247 outwardly and swings the boom assembly 86 upwardly through the medium of the arm 246. Fluid displaced by the piston of cylinder 248 is returned to the reservoir by pipe 254. When the circuit to the motor 251 is opened the weight of the outer end portion of the boom assembly 86 is sufficient to return the fluid from the rear end of the cylinder through the pump 250 to the reservoir and the rate of return flow of the fluid through the conduit 249 is regulated by a valve 255 so that movement of the abrasive wheel 107 into engagement with the work W may be accurately controlled. The valve 255 forms no part of the present invention but may be of a type having a throttling effect only on return flow of fluid. In this connection, it will be noted that downward swinging movement of the boom assembly is facilitated by a static weight 212' secured to the under side of the tubular housing 227.

The electric motor 251 as shown in Figure 36 of the drawings is connected in the power circuit 139 and as controlled by a switch DS-1 connected in the control circuit 140 in series with a contactor H. The switch DS-1 is provided with a control lever shown in Figure 1 of the drawings in a position adjacent the seat 84 where it may be conveniently manipulated by the operator.

The boom assembly 86 may also be oscillated or rotated in opposite directions about its axis in order to provide for "dressing" the abrasive wheel 107. The wheel will not become flattened but will wear evenly from one side to the other in a curve as a result of oscillation. As shown in Figures 15, 24 and 35 of the drawings, an arm 256 having a tubular part 257 secured to the lower end thereof is supported on the inner end of the tube 87 adjacent the corresponding end of the tubular housing 227. The tubular part 257 has diametrically opposed keys 258, shown 90° out of position in Figure 15 for the sake of clearness. The keys 258 respectively engage in diametrically opposed keyways 259 formed in the tube 87 and extending for the full length of the tube 87. The arrangement is such that rotation of the arm 256 in opposite directions rotates the boom tube 87 about its axis in corresponding directions.

As shown in Figures 24 and 25 of the drawings, the outer end of the arm 256 is provided with a radially extending slot 260 and a roller 261 is slidably supported in the slot 260. The roller 261 is mounted on a driving member 262 which in turn is secured to the power output shaft 263 of a speed reducer 264 mounted on housing 227. The speed reducer 264 is driven by a pulley 265 connected by a belt 266 to an electric motor 267 shown in Figure 2 of the drawings. The roller 261 is eccentrically located with respect to the axis of rotation of the driving member 262 so that the arm 256 is rotated in opposite directions in response to rotation of the power output shaft 263 or to the motor 267.

The electric motor 267 is shown in Figure 36 of the drawings as connected in the power circuit 139 and the operation of the motor 267 is controlled by a manually operable switch PB-1 and a selector switch SS-1. As shown in Figure 1 of the drawings, the selector switch SS-1 and the manual switch PB-1 are supported on the carriage 36 adjacent the seat 84 in positions to enable convenient operation thereof from a position on the seat 84.

Referring again to Figure 36 of the drawings, it will be noted that, when the selector switch SS-1 is in the "hand" position, closing of the switch PB-1 energizes the contactor T to effect manual tilting of the abrasive wheel 107 in opposite directions about the axis of the boom tube 87. Such "manual" tilting is, of course, accomplished by power, but the tilting action requires switch PB-1 to be manually depressed. When switch PB-1 is released, tilting stops. On the other hand, when the selector switch SS-1 is in the automatic or closed position, the contactor T is held energized and the abrasive wheel 107 is tilted continuously in opposite directions throughout the grinding operation.

Referring again to Figure 22 of the drawings, it will be noted that the portion of the boom tube 87 extending outwardly from the tubular housing 227 to the housing 89 for the abrasive wheel is enclosed within an extensible and flexible sleeve 268 which in the present instance is rotatable as a unit with the tube 87. In detail, the inner end of the sleeve 268 is clamped around a sleeve 269 which in turn encircles the tube 87 and is connected to the latter by diametrically opposed keys 270 respectively engaged in the keyways 259. The outer end of the sleeve 268 is clamped in a similar manner to the portion of the tube 87 immediately adjacent the housing 89 for the abrasive wheel.

Provision is made herein for conducting lubricant to the various parts of the machine requiring lubrication and with this in view reference is made to Figure 26 of the drawings wherein the numeral 271 designates a lubricant supply tank mounted in any suitable manner on the carriage 36. Supported within the tank 271 below the level of the lubricant is a conventional force feed type pump 272 having a vertically extending cylinder 273 and having a plunger 274 slidably supported within the cylinder 273. Lubricant from the tank is conducted into the cylinder 272 below the plunger 274 in the usual manner when the plunger is in its uppermost position, and is discharged from the lower end of the cylinder 272 through a supply pipe 275 upon downward movement of the plunger 274 in the cylinder 272.

The plunger 274 is operatively connected to an actuator 276 secured to the lower end of a rod 277 having the upper end extending through an enlarged opening formed in a lug 278 projecting laterally outwardly from the tubular housing 227. A stop in the form of a collar 279 is pinned to the rod 277 above the lug 278 so that each time the boom assembly 86 is swung upwardly the rod 277 is raised to in turn raise the plunger 274. A coil spring 280 acts on the plunger 274 to resist upward movement of the latter by the rod 277 so that when the boom assembly 86 is again lowered, the plunger 274 is forced downwardly in the cylinder 273 by the spring 280 to inject a supply of lubricant in the cylinder 273 below the plunger 274 through the pipe 275 to the parts of the machine connected to said pipe.

The operation of the machine is believed apparent from the foregoing description. Attention is called to the fact, however, that the boom assembly 86 including the abrasive wheel 107 is mounted on a carriage 36 which in turn is movable along the track 35 to enable grinding work pieces of substantial length. Also the boom 86 is movable inwardly and outwardly to feed the abrasive wheel 107 across the work piece during the grinding operation. The application of the optimum grinding pressure on the work throughout the feeding stroke of the boom or abrasive wheel is assured by the weight 212 which is movable as a unit with the boom but in a direction opposite the boom movement. Moreover, provision is made for either manually or continuously tilting the boom or abrasive wheel during the grinding operation so that the peripheral surface of the wheel may be maintained in properly dressed condition. In addition, the boom 86 may be swung vertically to move the abrasive wheel into and out of engagement with the work W. Movement of the abrasive wheel 107 into engagement with the work W is controlled to avoid damage to the work by the abrasive wheel. All of the foregoing movements of the boom or abrasive wheel 107 are under the control of an operator from a position on the carriage 36.

What I claim as my invention is:

1. A machine for removing metal from a work piece, comprising a boom having an abrasive wheel supported on the outer end for rotation about an axis extending transversely to the longitudinal axis of the boom, power means for rotating the abrasive wheel, means supporting the boom for movement along the longitudinal axis of the boom to feed the abrasive wheel in opposite directions relative to an adjacent work piece, a second power means for tilting the abrasive wheel in opposite directions about the longitudinal axis of the boom, a selector control for the second power means movable to different positions, means operable in one position of the selector control for operating the second power means continuously throughout the feeding stroke of the abrasive wheel and in another position of the selector control to render the second power means inoperative to tilt the abrasive wheel, and a manual control operable in the second named position aforesaid of the selector control to selectively operate the second power means.

2. A machine for removing metal from a work piece, comprising a boom having an abrasive wheel supported on the outer end for rotation about an axis extending transversely to the longitudinal axis of the boom, power means for rotating the abrasive wheel, means supporting the boom for oscillation about the longitudinal axis of the boom and for sliding movement along the latter axis to feed the abrasive wheel relative to an adjacent work piece, a second power means connected to the boom for oscillating the latter to tilt the abrasive wheel in opposite directions, a selectively operable control movable to different positions, means operable in one position of the control to provide continuous operation of the second power means and in another position to render the second power means inoperative to oscillate said boom, and a manual control operable in the second mentioned position of the selectively operable control to render the second power means operable to oscillate the boom.

3. A machine for removing metal from a workpiece, comprising supporting structure, a boom mounted on the supporting structure for sliding movement along the longitudinal axis of the boom, means pivotally mounting the boom on the supporting structure for swinging movement about an axis extending transversely of the longitudinal axis of said boom, a metal working tool carried by the boom at the outer side of the pivotal mounting, counterbalancing means for the boom mounted at the inner side of the pivotal mounting for sliding movement along the longitudinal axis of said boom, a reversible motor connected to the boom for sliding the latter in opposite directions along the longitudinal axis of the boom, means operatively connected to the motor for sliding the counterbalancing means in a direction opposite the direction of sliding movement of the boom, and means operative at each end of the feeding stroke of the boom for reversing the motor.

4. A machine for removing metal from a workpiece, comprising supporting structure, a longitudinal extending boom, means pivotally mounting the boom intermediate the ends thereof on the supporting structure permitting swinging movement of the boom in a vertical plane, means supporting the boom on the pivotal mounting means for sliding movement relative to the mounting means along the longitudinal axis of said boom, an abrasive wheel mounted for rotation on the boom outwardly beyond the pivotal mounting for said boom, a rotatable actuator connected to the boom and rotatable in opposite directions to successively slide the boom along its longitudinal axis in opposite directions to feed the abrasive wheel back and forth relative to a workpiece, counterbalancing means for the boom mounted at the inner side of the pivotal mounting means for sliding movement in opposite directions along the longitudinal axis of the boom, a rotatable actuator connected to the counterbalancing means and rotatable in opposite directions for successively sliding said counterbalancing means in opposite directions, and means interconnecting the actuators for rotating one actuator in a direction opposite the direction of rotation of the other actuator.

5. The structure defined in claim 4 comprising a reversible driver connected to one of the actuators, and means operative at each end of the feeding stroke of the boom for reversing said driver.

6. A machine for removing metal from a workpiece, comprising supporting structure, a longitudinally extending boom, means mounting the boom on the supporting structure for sliding movement along the longitudinal axis of the boom and for rotative movement about the longitudinal axis of the boom, an abrasive wheel mounted on the outer end of the boom for movement as a unit with the latter and for rotation relative to the boom about an axis extending transversely of the longitudinal axis of the boom, means on the supporting structure for moving the boom in opposite directions along the longitudinal axis of the boom to feed the abrasive wheel back and forth relative to a workpiece, power means for rotating the boom in opposite directions about the longitudinal axis of the boom to tilt the abrasive wheel in opposite directions relative to the workpiece, a prime mover mounted on the supporting structure and connected to the abrasive wheel for rotating said abrasive wheel about its axis, an electric control circuit for the power means, a selector switch in the control circuit movable to one position to close the control circuit and effect continuous operation of the power means and movable to a second position to open the control circuit and render said power means inoperative to rotate the boom, and a manually controlled switch in said control circuit shunting the selector switch.

7. A machine for removing metal from a workpiece, comprising supporting structure, a longitudinally extending boom, means pivotally mounting the boom intermediate the ends thereof on the supporting structure permitting swinging movement of the boom in a vertical plane, means supporting the boom on the pivotal mounting means for sliding movement relative to the mounting means along the longitudinal axis of said boom, an abrasive wheel mounted for rotation on the boom outwardly beyond the pivotal mounting for said boom, means for successively sliding the boom relative to the mounting means in opposite directions along the longitudinal axis of the boom to feed the abrasive wheel back and forth relative to the workpiece, counterbalancing means for the boom mounted at the inner side of the pivotal mounting means forسliding movement in opposite directions along the longitudinal axis of the boom, means operated in timed relationship to sliding movement of the boom in one direction for sliding said counterbalancing means in the opposite direction, power means for rotating the abrasive wheel, and means for selectively varying the speed of rotation of the abrasive wheel.

8. A machine for removing metal from a workpiece comprising supporting structure, a longitudinally extending boom, means pivotally mounting the boom intermediate the ends thereof on the supporting structure permitting swinging movement of the boom in a vertical plane, means supporting the boom on the pivotal mounting means for sliding movement relative to the mounting means along the longitudinal axis of said boom, an abrasive wheel mounted for rotation on the boom outwardly beyond the pivotal mounting for said boom, means for successively sliding the boom relative to the mounting means in opposite directions along the longitudinal axis of the boom to feed the abrasive wheel back and forth relative to the workpiece, counterbalancing means for the boom mounted at the inner side of the pivotal mounting means for sliding movement in opposite directions along the longitudinal axis of the boom, means operated in timed relationship to sliding movement of the boom in one direction for sliding said counterbalancing means in the opposite direction, power means for rotating the abrasive wheel, a second power means for tilting the abrasive wheel in opposite directions, and control means for the second power means selectively operable to provide for manual control of the second power means and to provide for continuous operation of the second power means throughout the feeding stroke of the abrasive wheel.

9. A machine for removing metal from a workpiece, a track, a carriage mounted on said track, a boom supported at its inner end on the carriage for oscillation about the longitudinal axis of the boom and for sliding movement along the latter axis, an abrasive wheel mounted on the outer end of the boom for rotation about an axis extending transversely of the longitudinal axis of the boom, a first power means on the carriage for rotating the abrasive wheel, a second power means on the carriage for sliding the boom back and forth along the longitudinal axis of the boom, a third power means on the carriage for oscillating the boom during the feeding stroke to continuously tilt the abrasive wheel in opposite directions about the longitudinal axis of the boom, independent controls on the carriage for selectively operating the aforesaid power means, a variable speed transmission for connecting the first power means to the abrasive wheel, and a control on the carriage for operating said transmission to vary the peripheral speed of the abrasive wheel.

10. A machine for removing metal from a workpiece, a track, a carriage mounted on said track, a boom supported at its inner end on the carriage for oscillation about the longitudinal axis of the boom and for sliding movement along the latter axis, an abrasive wheel mounted on the outer end of the boom for rotation about an axis extending transversely of the longitudinal axis of the boom, a first power means on the carriage for rotating the abrasive wheel, a second power means on the carriage for sliding the boom back and forth along the longitudinal axis of the boom, a third power means on the carriage for oscillating the boom during the feeding stroke to continuously tilt the abrasive wheel in opposite directions about the longitudinal axis of the boom, independent controls on the carriage for selectively operating the aforesaid power means, the control for the third power operated means comprising a selector movable to different positions, means operative in one position of the selector to continuously operate the third power means to oscillate the boom and in another position of the selector to render the third power means inoperative to oscillate the boom, the control for the third power operated means also having a manual control operable in the second position of the selector to render the third power means operative to oscillate the boom.

11. A machine for removing metal from a workpiece comprising supporting structure, a boom, means pivotally mounting said boom on said supporting structure for swinging movement about an axis extending transversely of the longitudinal axis of said boom, a metal working tool carried by said boom at the outer side of said pivotal mounting, counterbalancing means for said boom mounted at the inner side of the pivotal mounting for sliding movement along the longitudinal axis of said boom, and power means for sliding said tool in opposite directions along the longitudinal axis of said boom, said power means being operatively connected to said counterbalancing means for sliding the latter in a direction opposite the direction of sliding movement of said tool, and means operative at each end of the feeding stroke of said tool for reversing said power means.

12. A machine for removing metal from a workpiece comprising supporting structure, a boom mounted on said supporting structure for sliding movement along the longitudinal axis of said boom, means pivotally mounting said boom on said supporting structure for swinging movement about an axis extending transversely of the longitudinal axis of said boom, a metal working tool carried by said boom at the outer side of the pivotal mounting, counterbalancing means for said boom mounted at the inner side of the pivotal mounting for sliding movement along the longitudinal axis of said boom, a reversible motor operatively connected to said boom for sliding the latter in opposite directions along the longitudinal axis of said boom, said motor also being operatively connected to said counterbalancing for sliding the latter in a direction opposite the direction of sliding movement of said boom, and means operative at each end of the feeding stroke of said boom for reversing said motor.

13. A machine for removing metal from a workpiece comprising supporting structure, a longitudinally extending boom, means mounting the boom on the supporting structure for rotative movement about the longitudinal axis of the boom, an abrasive wheel mounted on the outer end of the boom for movement as a unit with the latter and for rotation relative to the boom about an axis extending transversely of the longitudinal axis of the boom, power means for rotating the boom in opposite directions about the longitudinal axis of the boom to tilt the abrasive wheel in opposite directions relative to the workpiece, a prime mover mounted on the supporting structure and connected to the abrasive wheel for rotating said abrasive wheel about its axis, an electric control circuit for the power means, a selector switch in the control circuit movable to one position to close the control circuit and effect continuous operation of the power means and movable to a second position to open the control circuit and render said power means inoperative to rotate the boom, and a manually controlled switch in said control circuit shunting the selector switch.

14. A machine for removing metal from a work piece, comprising frame structure, a boom mounted on said frame structure and having an abrasive wheel supported thereon for rotation about an axis extending transversely of the longitudinal axis of said boom, power means for rotating said wheel about its axis, a second power means for tilting said abrasive wheel in opposite directions about the longitudinal axis of said boom, a selector control for said second power means movable to different positions, means operable in one position of said selector control for operating said second power means continuously and in another position of said selector control to render said second power means inoperative to tilt said abrasive wheel, and a manual control operable in the second named position aforesaid of said selector control to selectively operate said second power means.

15. A machine for removing metal from a work piece, comprising frame structure, a boom mounted on said frame structure and having an abrasive wheel supported thereon for rotation about an axis extending transversely of the longitudinal axis of said boom, power means for rotating said wheel about its axis, a second power means for tilting said abrasive wheel in opposite directions about the longitudinal axis of said boom, an electric control circuit for said second power means, a selector switch in said control circuit movable to one position to close said control circuit and effect continuous operation of said second power means and movable to a second position to open said control circuit and render said second power means inoperative to tilt said abrasive wheel, and a manually controlled switch in said control circuit shunting said selector switch.

16. A machine for removing metal from a work piece comprising a carriage movable along a predetermined path of travel, frame structure mounted on said carriage, a boom extending transversely of the path of travel of said carriage and having an abrasive wheel mounted on the outer end of said boom for movement as a unit therewith and for rotation about its axis, the axis of rotation of said abrasive wheel extending transversely of the longitudinal axis of said boom, means supporting the inner end of said boom on said frame structure for sliding movement in opposite directions along the longitudinal axis of said boom and for rotation in opposite directions along the longitudinal axis of said boom, means for sliding said boom in opposite directions along its longitudinal axis and for rotating said boom in opposite directions about its longitudinal axis to impart a corresponding movement to said abrasive wheel, a prime mover on said frame structure for rotating said abrasive wheel about its axis, and variable speed power transmitting mechanism connecting said prime mover to said wheel said mechanism comprising members alternately operative to establish a driving connection between said prime mover and said abrasive wheel, a shiftable element for alternately shifting said member between operative and inoperative positions, and means for operating said element.

17. The structure defined in claim 16 in which said last-named means comprises an electrically operable device, a control for said device on said frame structure, and means on said carriage for accommodating an operator in close proximity to said control for convenient operation of the latter by an operator.

18. The structure defined in claim 17 in which the boom is also pivotally mounted on the frame structure for vertical swinging movement to move the abrasive wheel into and out of engagement with a work piece, and power means for swinging said boom.

(References on following page)

References Cited in the file of this patent

UNITED STATES PATENTS

| | | |
|---|---|---|
| 753,477 | Drake | Mar. 1, 1904 |
| 985,412 | Hattersley et al. | Feb. 28, 1911 |
| 1,126,212 | Hendee | Jan. 26, 1915 |
| 1,394,125 | Stailey | Oct. 18, 1921 |
| 1,413,928 | Mummert et al. | Apr. 25, 1922 |
| 1,427,799 | Foulk | Sept. 5, 1922 |
| 1,553,167 | Hyde | Sept. 8, 1925 |
| 1,674,669 | Stedman | June 26, 1928 |
| 1,696,660 | Wegner | Dec. 25, 1928 |
| 1,724,115 | Stratton | Aug. 13, 1929 |
| 1,841,032 | Hutchinson | Jan. 12, 1932 |
| 1,953,325 | Morgan | Apr. 3, 1934 |
| 2,033,395 | Peaslee | Mar. 10, 1936 |
| 2,171,892 | Richardson | Sept. 5, 1939 |
| 2,262,049 | Robinson | Nov. 11, 1941 |
| 2,310,870 | Retterath | Feb. 9, 1943 |
| 2,403,341 | Carlson | July 2, 1946 |
| 2,442,042 | Hamilton | May 25, 1948 |
| 2,487,949 | Shekels | Nov. 15, 1949 |
| 2,541,045 | Ferwerda | Feb. 13, 1951 |
| 2,592,946 | Ohmstede | Apr. 15, 1952 |
| 2,627,704 | Whitehouse | Feb. 10, 1953 |
| 2,651,888 | Comstock | Sept. 15, 1953 |

FOREIGN PATENTS

| | | |
|---|---|---|
| 711,791 | France | July 8, 1931 |